United States Patent
Dutta et al.

(10) Patent No.: US 10,348,222 B2
(45) Date of Patent: Jul. 9, 2019

(54) SYSTEMS AND METHODS FOR REDUCING DC LINK VOLTAGE DYNAMICS WITH LIMITED ENERGY STORAGE ELEMENT

(71) Applicant: Deere & Company, Moline, IL (US)

(72) Inventors: Sumit Dutta, Fargo, ND (US); Long Wu, Fargo, ND (US); Danielle Li, Fargo, ND (US); Brij N. Singh, West Fargo, ND (US); Jared Lervik, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/635,376

(22) Filed: Jun. 28, 2017

(65) Prior Publication Data
US 2018/0062547 A1    Mar. 1, 2018

Related U.S. Application Data

(60) Provisional application No. 62/379,889, filed on Aug. 26, 2016.

(51) Int. Cl.
| | | |
|---|---|---|
| H02P 5/74 | (2006.01) | |
| H02P 6/04 | (2016.01) | |
| H02P 21/00 | (2016.01) | |
| H02P 27/08 | (2006.01) | |
| H02P 29/66 | (2016.01) | |
| H02P 25/022 | (2016.01) | |

(Continued)

(52) U.S. Cl.
CPC ............. *H02P 6/04* (2013.01); *B60L 11/08* (2013.01); *B60L 11/12* (2013.01); *H02P 5/74* (2013.01); *H02P 25/022* (2013.01); *H02P 29/662* (2016.11); *H02P 21/00* (2013.01); *H02P 27/08* (2013.01)

(58) Field of Classification Search
CPC .......................................................... H02P 6/04
USPC ................................................... 318/490, 34
See application file for complete search history.

(56) References Cited

U.S. PATENT DOCUMENTS

| | | | | |
|---|---|---|---|---|
| 6,486,632 | B2 * | 11/2002 | Okushima | B60L 11/123 318/151 |
| 7,196,488 | B2 * | 3/2007 | Matsubara | G05B 19/414 318/41 |

(Continued)

OTHER PUBLICATIONS

International Search Report and Written Opinion dated Dec. 26, 2017.

*Primary Examiner* — David Luo
(74) *Attorney, Agent, or Firm* — Harness, Dickey & Pierce, P.L.C.

(57) ABSTRACT

In an example embodiment, a controller includes a memory having computer-readable instructions stored therein and a processor. The processor is configured to execute the computer-readable instructions to determine a first set of inductance values for at least one load machine and second set of inductance values for a generator machine, determine a first set of gains for the at least one load machine based on the first set of inductance values and a regulator bandwidth, determine a second set of gains for the generator machine based on the second set of inductance values and the regulator bandwidth, and generate voltage commands for driving the at least one load machine and the generator machine based on at least the first and second sets of gains.

18 Claims, 12 Drawing Sheets

(51) Int. Cl.
  *B60L 11/08* (2006.01)
  *B60L 11/12* (2006.01)

(56) References Cited

U.S. PATENT DOCUMENTS

| | | | |
|---|---|---|---|
| 7,888,894 B2 * | 2/2011 | Sugawara | B60K 6/46 |
| | | | 318/139 |
| 2007/0241715 A1 | 10/2007 | Fujiwara et al. | |
| 2007/0253231 A1 | 11/2007 | Agirman et al. | |
| 2009/0167231 A1 | 7/2009 | Sussmeier et al. | |
| 2014/0002110 A1 | 1/2014 | Adachi et al. | |
| 2014/0015257 A1 | 1/2014 | Dobbs | |
| 2015/0214864 A1 | 7/2015 | Sopko | |

* cited by examiner

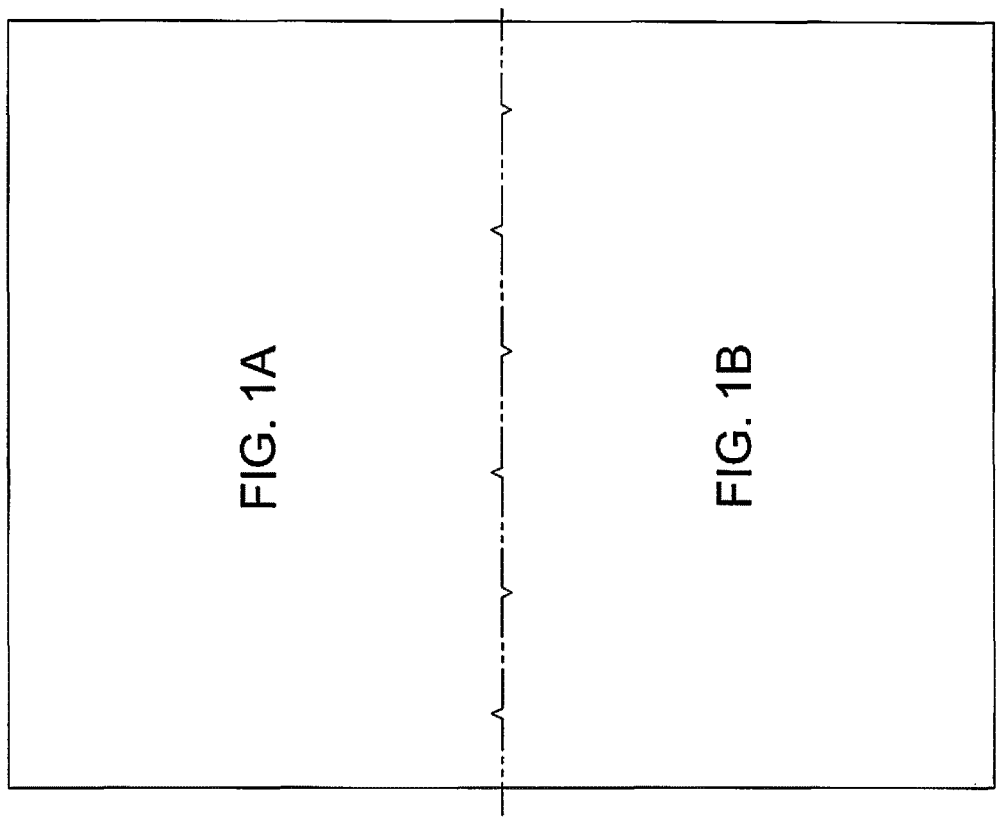

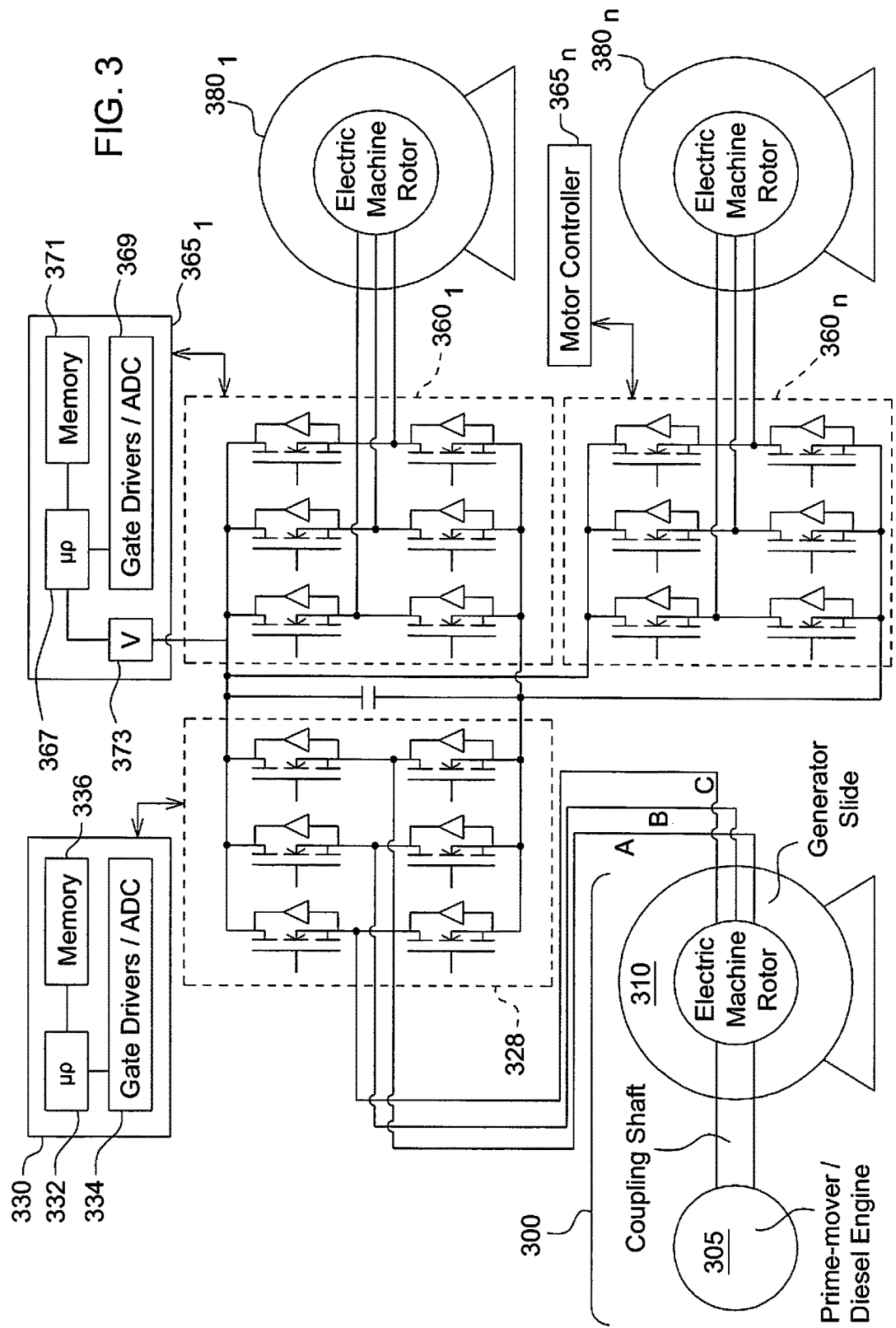

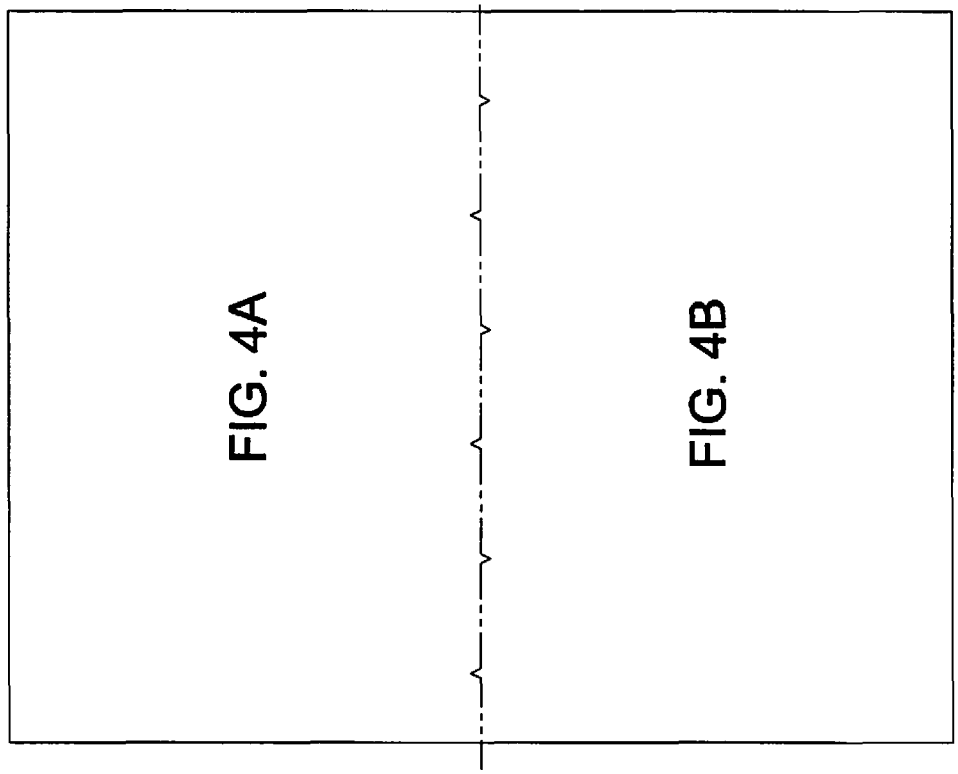

SYSTEMS AND METHODS FOR REDUCING DC LINK VOLTAGE DYNAMICS WITH LIMITED ENERGY STORAGE ELEMENT

PRIORITY

This application claims priority to U.S. Provisional Application No. 62/379,889, filed Aug. 26, 2016, the entire contents of which are hereby incorporated by reference.

FIELD

Example embodiments are related to systems and methods for enabling a reduction in a size of a DC bus capacitor.

SUMMARY

At least one example embodiment provides a controller including a memory having computer-readable instructions stored therein and a processor configured to execute the computer-readable instructions to, determine a first set of inductance values for at least one load machine and second set of inductance values for a generator machine, determine a first set of gains for the at least one load machine based on the first set of inductance values and a regulator bandwidth, determine a second set of gains for the generator machine based on the second set of inductance values and the regulator bandwidth, and generate voltage commands for driving the at least one load machine and the generator machine based on at least the first and second sets of gains.

In an example embodiment, the processor is configured to execute the computer-readable instructions to determine a first set of voltage and current values for the at least one load machine and a second set of voltage and current values the generator machine, determine the first set of inductance values based on the first set of voltage and current values, and determine the second set of inductance values based on the second set of voltage and current values.

In an example embodiment, the at least one processor is configured to execute the computer-readable instructions to, receive a torque command for the at least one load machine, and determine current values of the first set of voltage and current values, and current values of voltage and current values for supplying the received torque command.

BRIEF DESCRIPTION OF THE DRAWINGS

Example embodiments will be more clearly understood from the following detailed description taken in conjunction with the accompanying drawings. FIGS. 1-8 represent non-limiting, example embodiments as described herein.

FIG. 1 illustrates a block diagram of FIGS. 1A-1B;

FIG. 2 is a block diagram of an electronic data processing system consistent with FIGS. 1A-1B, according to an example embodiment;

FIG. 3 illustrates a drive system according to an example embodiment;

FIG. 4 illustrates a block diagram of FIGS. 4A-4B;

FIG. 5 illustrates a method of reducing delay in a feedforward torque command according to an example embodiment;

FIG. 6 illustrates method of reducing delay in a feedforward torque command according to an example embodiment;

FIG. 7 illustrates a synchronized output of steps illustrated in FIG. 6; and

FIG. 8 illustrates a drive system according to an example embodiment.

DETAILED DESCRIPTION

Figure 1A:
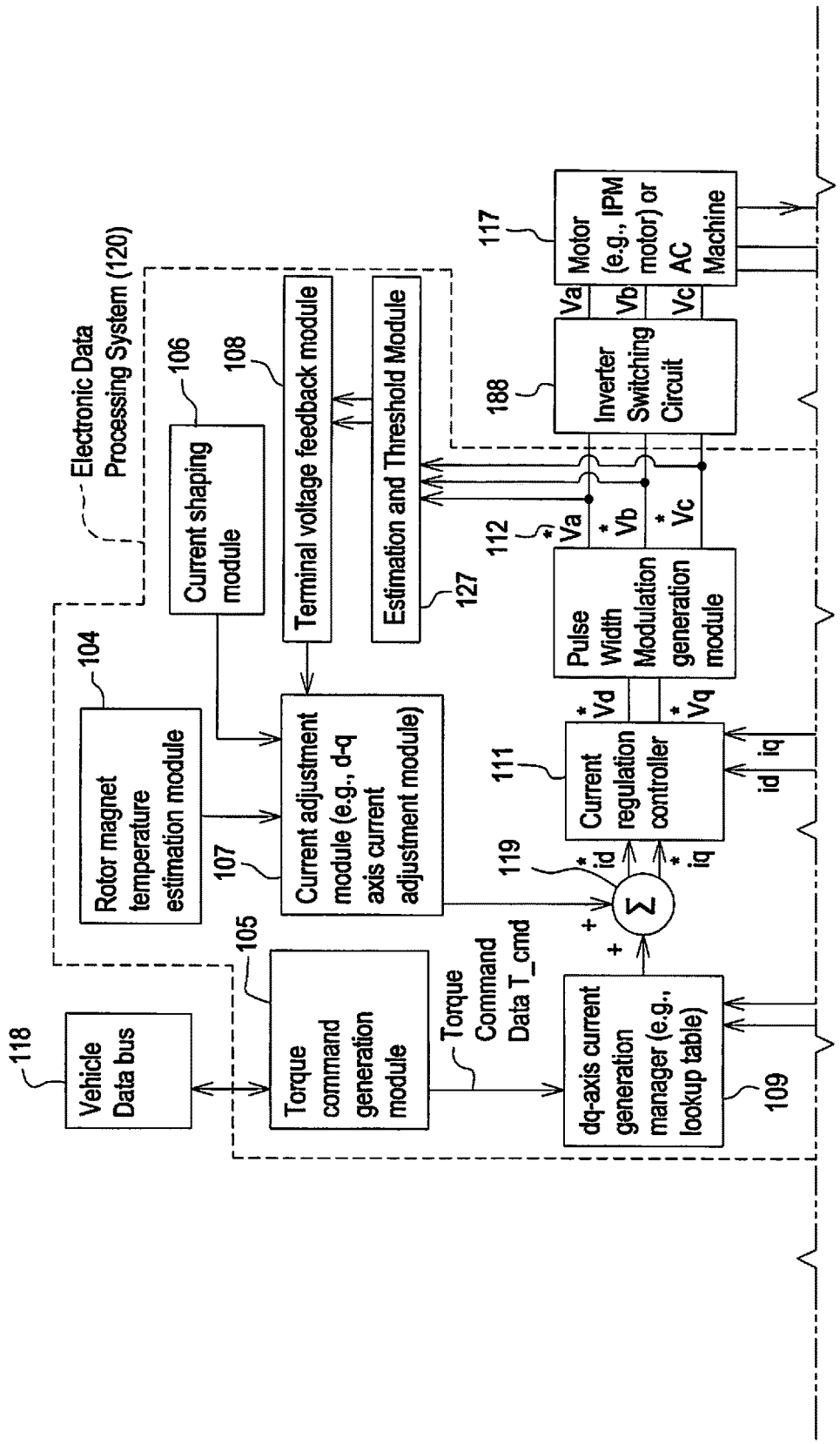
FIGS. 1A-1B is a block diagram of a system for controlling an electrical motor, according to an example embodiment.

Some example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one embodiment of the invention relates to a non-transitory computer-readable storage medium comprising electronically readable control information stored thereon, configured in such that when the storage medium is used in a controller of a magnetic resonance device, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

In an example embodiment, the at least one processor is configured to execute the computer-readable instructions to determine the current values of the first set of voltage and current values, and the current values of the second set voltage and current values prior to generating any of the voltage commands for the at least one load machine and the generator machine.

In an example embodiment, the at least one processor is configured to execute the computer-readable instructions to determine the current values for the generator machine by determining a generator torque command, and determining the current values of the second set of voltage and current values based on the determined generator torque command.

In an example embodiment, the at least one processor is configured to execute the computer-readable instructions to determine the generator torque command based on the received torque command and an initial generator torque command obtained based on a direct current (DC) voltage output of a proportional-integral controller.

In an example embodiment, the at least one processor is configured to execute the computer-readable instructions to generate a feedforward torque command based on the received torque command, a ratio of a speed of a rotor shaft of the at least one load machine to a speed of a rotor shaft of the generator machine and an efficiency factor, and determine the generator torque command based on the feedforward torque command and the initial generator torque command.

In an example embodiment, upon having two or more load machines, the at least one processor is configured to execute the computer-readable instructions to generate the feedforward torque command for each of the two or more load machines, and determine the generator torque command based on a sum of the generated feedforward torque commands, the generator torque command being generated simultaneously with a receipt of a corresponding torque command at each of the two or more load machines.

In an example embodiment, the first set of inductance values are d-axis and q-axis inductances of the at least one load machine, the second set of inductance values are d-axis and q-axis inductances of the generator machine, the first set of gains are d-axis and q-axis P-I gains of a proportional integral controller of at least one load machine, the second set of gains are d-axis and q-axis P-I gains of a proportional integral controller of the generator machine, the voltage commands of the at least one load machine are d-axis and q-axis voltage commands of the at least one load machine, and the voltage commands of the generator machine are d-axis and q-axis voltage commands of the generator machine.

At least one example embodiment provides a system including at least one load machine coupled to a first inverter, a generator machine coupled to a second inverter and a controller configured to synchronize a generation of voltage commands for driving the at least one load machine and the generator machine such that a reliance of at least one load machine on charge stored in a capacitor coupled to the first and second inverter for meeting a torque command is lower compared to when the controller generates the voltage commands asynchronously.

In an example embodiment, the synchronization allows a reduction in a size of the capacitor relative to the asynchronous generation of the voltage commands by the controller.

In an example embodiment, the system further includes an inverter circuit including the first inverter, the second inverter and the capacitor. A size of the inverter circuit is smaller due to the reduction in the size of the capacitor compared to an inverter circuit used during the asynchronous generation of the voltage commands by the controller.

In an example embodiment, the system further includes at least two or more load machines, each of the at least two or more load machines has a corresponding first inverter. The controller is configured to synchronize the generation of the voltage commands for driving the at least two or more load machines and the generator machine.

In an example embodiment, the controller is configured to synchronize the generation of voltage commands for driving the at least one load machine and the generator machine by determining a first set of inductance values for at least one load machine and second set of inductance values for a generator machine, determining a first set of gains for the at least one load machine based on the first set of inductance values and a current bandwidth, determining a second set of gains for the generator machine based on the second set of inductance values and the current bandwidth, and synchronizing the generation of the voltage commands for driving the at least one load machine and the generator machine based on at least the first and second sets of gains.

In an example embodiment, the controller is configured to determine a first set of voltage and current values for the at least one load machine and a second set of voltage and current values the generator machine, determine the first set of inductance values for the at least one load machine based on the first set of voltage and current values, and determine the second set of inductance values based on the second set of voltage and current values.

In an example embodiment, the controller is configured to synchronize the generation of the voltage commands by receiving a torque command for the at least one load machine and simultaneously utilizing the torque command to determine the current values of the first set of voltage and current values, and the current values of the second set of voltage and current values based on the torque command.

In an example embodiment, the system further includes a diesel engine configured to operate at a near fixed speed, the diesel engine being coupled to the generator machine.

In an example embodiment, the first inverter and the second inverter are connected to a same direction current (DC) bus and the second inverter is configured to operate voltage control mode.

In an example embodiment, the second inverter is configured to regulate a voltage of the DC bus.

In one example embodiment, a controller is coupled to a first inverter and a second inverter forming a parallel inverter scheme. The first inverter and the second inverter are configured to provide power to a load. The controller is configured to control the first inverter to operate according to a first operating state, while the second inverter is off, and turn off the first inverter before transition from the first operating state to a second operating state. The controller is further configured to control the second inverter to at least partially operate during the transition.

In yet another example embodiment, the controller is configured to at least partially turn on the second inverter, and turn off the first inverter after partially turning on the second inverter such that the operation of the first inverter and the operation of the second inverter partially overlap before the first inverter is turned off.

In yet another example embodiment, the controller is configured to turn on the first inverter in the second operating state before turning off the at least partially operating second inverter such that the operation of the first inverter and the operation of the second inverter partially overlap before the at least partially operating second inverter is turned off, and turn off the at least partially operating second inverter.

In yet another example embodiment, the first inverter includes a first plurality of pairs of switches, the second inverter includes a second plurality of pairs of switches, and in controlling the second inverter to at least partially operate, the controller is configured to turn on one or more of the second plurality of pairs of switches of the second inverter corresponding to one or more of the first plurality of pairs of switches of the first inverter that operate differently in the second operating state compared to the first operating state.

In yet another example embodiment, the first inverter is comprised of a first plurality of transistors, and the second inverter is comprised of a second plurality of transistors.

In yet another example embodiment, each of the first plurality of transistors and the second plurality of transistors are power switches.

In yet another example embodiment, the controller is configured to supply a first set of voltages to the first inverter and a second set of voltages to the second inverter for controlling the first inverter and the second inverter based on current requirements and feedback from the first inverter and the second inverter.

In one example embodiment, a voltage command generator is coupled to a parallel inverter scheme having a first inverter and a second inverter. The voltage command generator is configured to receive a plurality of voltage commands from a machine controller and generate a first command and second command based on each of the received voltage commands to control the first inverter to operate according to a first operating state, while the second inverter is off, and turn off the first inverter before transition from the first operating state to a second operating state. The voltage command generator is further configured to control the second inverter to at least partially operate during the transition.

In yet another example embodiment, the voltage command generator is configured to at least partially turn on the second inverter, and turn off the first inverter after partially turning on the second inverter such that the operation of the first inverter and the operation of the second inverter partially overlap before the first inverter is turned off.

In yet another example embodiment, the voltage command generator is configured to, turn on the first inverter in the second operating state before turning off the at least partially operating second inverter such that the operation of the first inverter and the operation of the second inverter partially overlap before the at least partially operating second inverter is turned off, and turn off the at least partially operating second inverter.

In yet another example embodiment, the first inverter includes a first plurality of pairs of switches, the second inverter include a second plurality of pairs of switches, and in controlling the second inverter to at least partially operate, the voltage command generator is configured to turn on one or more of the second plurality of pairs of switches of the second inverter corresponding to one or more of the first plurality of pairs of switches of the first inverter that operate differently in the second operating state compared to the first operating state.

In yet another example embodiment, the first inverter is comprised of a first plurality of transistors, and the second inverter is comprised of a second plurality of transistors.

In yet another example embodiment, each of the first plurality of transistors and the second plurality of transistors are power switches.

In yet another example embodiment, the machine controller is configured to provide the plurality of voltage commands according to current requirements and feedback from the first inverter and the second inverter.

In one example embodiment, a parallel inverter scheme includes a first inverter configured to receive voltage commands from a machine controller, operate according to a first operating state, while a second inverter of the parallel inverter scheme is off, and turn off before transition from the first operating state to a second operating state. The parallel inverter scheme further includes the second inverter configured to receive the voltage commands from the machine controller, and at least partially operate during the transition.

In yet another example embodiment, the second inverter is configured to at least partially turn on, and the first inverter is configured to turn off after the second inverter is turned on such that the operation of the first inverter and the operation of the second inverter partially overlap before the first inverter is turned off.

In yet another example embodiment, the first inverter is configured to turn on in the second operating state before the at least partially operating second inverter is tuned off such that the operation of the first inverter and the operation of the second inverter partially overlap before the at least partially operating second inverter is turned off, and the at least partially operating second inverter is configured to turn off.

In yet another example embodiment, the first inverter includes a first plurality of pairs of switches, the second inverter include a second plurality of pairs of switches, and while at least partially operating, the second invertor is configured to turn on one or more of the second plurality of pairs of switches of the second inverter corresponding to one or more of the first plurality of pairs of switches of the first inverter that operate differently in the second operating state compared to the first operating state.

In yet another example embodiment, the first inverter is comprised of a first plurality of transistors, and the second inverter is comprised of a second plurality of transistors.

In yet another example embodiment, each of the first plurality of transistors and each of the second plurality of transistors are power switches.

Figure 1B:
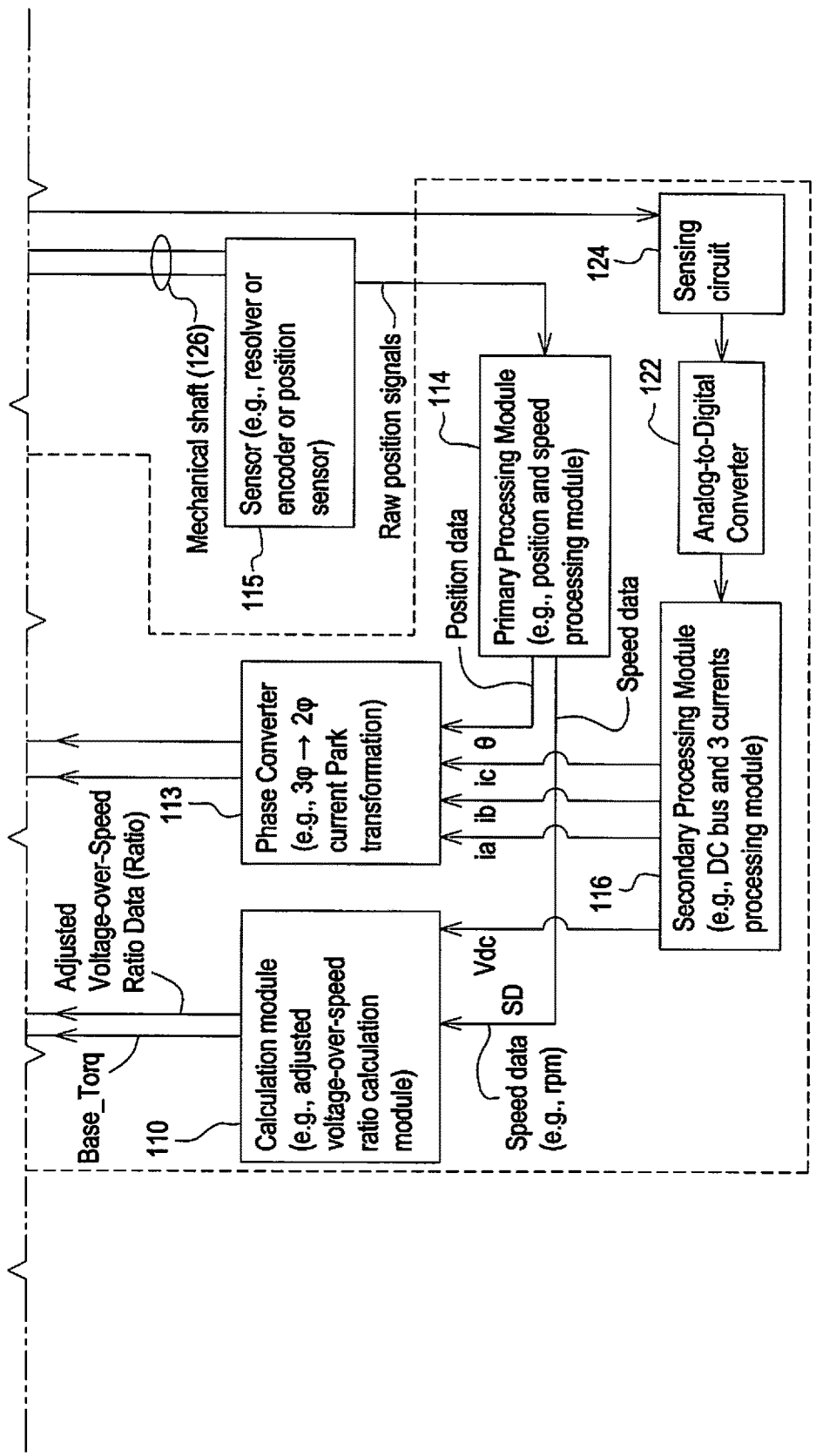

FIG. 1 is a block diagram of a system for controlling an electrical motor, according to an example embodiment. FIG. 1A illustrates a first portion of the system of FIG. 1, according to an example embodiment. FIG. 1B illustrates a second portion of the system of FIG. 1, according to an example embodiment. The electrical motor may be a motor such as a motor 117 (e.g., an interior permanent magnet (IPM) motor) or another alternating current machine controlled by the electronic data processing system 120. Hereinafter, the terms, hybrid machine, electrical motor, AC machine and a motor may be used interchangeably. The motor 117 has a nominal dc bus voltage (e.g., 320 Volts). The nominal voltage is a named voltage. For example, a nominal voltage of the motor 117 may be 320 Volts, but the motor may operate at a voltage above and below 320 Volts. Hereinafter, the motor 117 may also be referred to as the load 117.

In an example embodiment, the electronic data processing system 120 may be referred to as a motor controller or an IPM machine system.

The electronic data processing system 120 includes electronic modules, software modules, or both. In an example embodiment, the electronic data processing system 120 includes a processor and a memory to support storing, processing and execution of software instructions of one or more software modules. The electronic data processing system 120 is indicated by the dashed lines in FIG. 1 and is shown in greater detail in FIG. 2.

In an example embodiment, a torque command generation module 105 is coupled to a d-q axis current generation manager 109 (e.g., d-q axis current generation look-up tables). The d-q axis current refers to the direct axis current and the quadrature axis current as applicable in the context of vector-controlled alternating current machines, such as the motor 117. The output of the d-q axis current generation manager 109 (d-q axis current commands iq_cmd and id_cmd) and the output of a current adjustment module 107 (e.g., d-q axis current adjustment module 107) are fed to a summer 119. In turn, one or more outputs (e.g., direct axis current data (id*) and quadrature axis current data (iq*)) of the summer 119 are provided or coupled to a current regulation controller 111. While the term current command is used, it should be understood that current command refers to a target current value.

The current regulation controller 111 is capable of communicating with the pulse-width modulation (PWM) generation module 112 (e.g., space vector PWM generation module). The current regulation controller 111 receives respective adjusted d-q axis current commands (e.g., id* and iq*) and actual d-q axis currents (e.g., id and iq) and outputs corresponding d-q axis voltage commands (e.g., vd* and vq* commands) for input to the PWM generation module 112.

In an example embodiment, the PWM generation module 112 converts the direct axis voltage and quadrature axis voltage data from two phase data representations into three phase representations (e.g., three phase voltage representations, such as va*, vb* and vc*) for control of the motor 117. va*, vb* and vc* may be referred to as inverter terminal voltages. Outputs of the PWM generation module 112 are coupled to an inverter circuit 188. The output stage of the inverter circuit 188 (e.g., output terminal voltages va, vb and vc) provides a pulse-width modulated voltage waveform or other voltage signal for control of the motor 117. In an example embodiment, the inverter circuit 188 is powered by a direct current (dc) voltage bus. As will be further described below, there may be more than one inverter in the inverter circuit 188. For example, there may be a generator side inverter associated with a generator machine and a separate inverter (load inverter) associated with the load machine (load motor 117). In one example embodiment, if there is more than one load machine, then there may be a corresponding number of load inverters in the inverter circuit 188.

Alternatively, there may be two or more inverter circuits 188, where each inverter circuit is either associated with either the generator machine or one or more load machines.

In one example embodiment, the inverter switching circuit 188 includes two or more inverters, each of which is a semiconductor drive circuit that drives or controls switching semiconductors (e.g., insulated gate bipolar transistors (IGBT) or other power transistors, including but not limited to, a metal-oxide Semiconductor Field-Effect Transistor (MOSFET), a Silicon Carbide MOSFET or a Silicon Carbide IGBT) to output control signals for the motor 117. In turn, the inverter circuit 188 is coupled to the motor 117. The inverter switching circuit will be further described with respect to FIGS. 3A-7.

The motor 117 is associated with a sensor 115 (e.g., a position sensor, a resolver or encoder position sensor) that is associated with the motor shaft 126 or the rotor. The sensor 115 and the motor 117 are coupled to the electronic data processing system 120 to provide feedback data (e.g., current feedback data, such as phase current values ia, ib and ic), raw position signals, among other possible feedback data or signals, for example. Other possible feedback data includes, but is not limited to, winding temperature readings, semiconductor temperature readings of the inverter circuit 188, three phase voltage data, or other thermal or performance information for the motor 117.

The motor 117 is associated with the sensor 115 (e.g., a resolver, encoder, speed sensor, or another position sensor or speed sensors) that estimates at least one of an angular position of the motor shaft 126, a speed or velocity of the motor shaft 126, and a direction of rotation of the motor shaft 126. The sensor 115 may be mounted on or integral with the motor shaft 126. The output of the sensor 115 is capable of communication with the primary processing module 114 (e.g., position and speed processing module). In an example embodiment, the sensor 115 may be coupled to an analog-to-digital converter (not shown) that converts analog raw position data or velocity data to digital raw position or velocity data, respectively. In other example embodiments, the sensor 115 (e.g., digital position encoder) may provide a digital data output of raw position data or velocity data for the motor shaft 126 or rotor.

A first output (e.g., position data θ for the motor 117) of the primary processing module 114 is communicated to the phase converter 113 (e.g., three-phase to two-phase current Park transformation module) that converts respective three-phase digital representations of measured current into corresponding two-phase digital representations of measured current. A second output (e.g., speed data SD for the motor 117) of the primary processing module 114 is communicated to the calculation module 110 (e.g., adjusted voltage over speed ratio module).

An input of a sensing circuit 124 is coupled to terminals of the motor 117 for sensing at least the measured three-phase currents and a voltage level of the direct current (dc) bus (e.g., high voltage dc bus which may provide dc power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., dc bus voltage and three phase current processing module). For example, the sensing circuit 124 is associated with the motor 117 for measuring three phase currents (e.g., current applied to the windings of the motor 117, back EMF (electromotive force) induced into the windings, or both).

Certain outputs of the primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data ia, ib and is from the secondary processing module 116 and position data θ from the sensor 115. The output of the phase converter 113 module (id, iq) is coupled to the current regulation controller 111.

Other outputs of the primary processing module 114 and the secondary processing module 116 may be coupled to inputs of the calculation module 110 (e.g., adjusted voltage over-speed ratio calculation module). For example, the primary processing module 114 may provide the speed data SD (e.g., motor shaft 126 speed in revolutions per minute), whereas the secondary processing module 116 may provide a measured (detected) level of the operating dc bus voltage Vdc of the motor 117 (e.g., on the dc bus of a vehicle). The dc voltage level on the dc bus that supplies the inverter circuit 188 with electrical energy may fluctuate or vary because of various factors, including, but not limited to, ambient temperature, temperature of power electronic devices, damage suffered by power electronic devices even during and/or within the design life cycle of power electronic inverter, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 is connected as an intermediary between the secondary processing module 116 and the d-q axis current generation manager 109. The output of the calculation module 110 can adjust or impact the current commands iq_cmd and id_cmd generated by the d-q axis current generation manager 109 to compensate for fluctuation or variation in the dc bus voltage, among other things.

The rotor magnet temperature estimation module 104, the current shaping module 106, and the terminal voltage feedback module 108 are coupled to or are capable of communicating with the d-q axis current adjustment module 107. In turn, the d-q axis current adjustment module 107 may communicate with the d-q axis current generation manager or the summer 119.

The rotor magnet temperature estimation module 104 estimates or determines the temperature of the rotor permanent magnet or magnets. In an example embodiment, the rotor magnet temperature estimation module 104 may estimate the temperature of the rotor magnets from, one or more sensors located on the stator, in thermal communication with the stator, or secured to the housing of the motor 117.

In another example embodiment, the rotor magnet temperature estimation module 104 may be replaced with a temperature detector (e.g., a thermistor and wireless transmitter like infrared thermal sensor) mounted on the rotor or the magnet, where the detector provides a signal (e.g., wireless signal) indicative of the temperature of the magnet or magnets.

In another example embodiment, the rotor magnet temperature estimation module 104 may be replaced with a back electromotive force (EMF) sensed at the known speed of the Permanent Magnet motor and indirectly estimated to indicate the temperature of the magnet or magnets.

In an example embodiment, the system may operate in the following manner. The torque command generation module 105 receives an input control data message, such as a speed control data message, a voltage control data message, or a torque control data message, over a vehicle data bus 118. The torque command generation module 105 converts the received input control message into torque control command data T_cmd.

The d-q axis current generation manager 109 selects or determines the direct axis current command and the quadrature axis current command associated with respective torque control command data and respective detected motor shaft 126 speed data SD. For example, the d-q axis current generation manager 109 selects or determines the direct axis current command and the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. The sensor 115 on the motor 117 facilitates provision of the detected speed data SD for the motor shaft 126, where the primary processing module 114 may convert raw position data provided by the sensor 115 into speed data SD.

The current adjustment module 107 (e.g., d-q axis current adjustment module) provides current adjustment data to adjust the direct axis current command id_cmd and the quadrature axis current command iq_cmd based on input data from the rotor magnet temperature estimation module 104, the current shaping module 106, and terminal voltage feedback module 108.

The current shaping module 106 may determine a correction or preliminary adjustment of the quadrature axis (q-axis) current command and the direct axis (d-axis) current command based on one or more of the following factors: torque load on the motor 117 and speed of the motor 117, for example. The rotor magnet temperature estimation module 104 may generate a secondary adjustment of the q-axis current command and the d-axis current command based on an estimated change in rotor temperature, for example. The terminal voltage feedback module 108 may provide a third adjustment to d-axis and q-axis current based on controller voltage command versus voltage limit. The current adjustment module 107 may provide an aggregate current adjustment that considers one or more of the following adjustments: a preliminary adjustment, a secondary adjustment, and a third adjustment.

The terminal voltage feedback module 108 may further provide an additional feedback for adjustment to d-axis and q-axis current based on a terminal voltage threshold and estimates of the actual terminal voltages Va, Vb and Vc provided by an estimation and threshold module 127, as will be described below. The estimation and threshold module 127 may further be coupled to outputs of the PWM generation module 112, which may provide the estimation and threshold module 127 with the inverter terminal voltages (Va*, Vb* and Vc*). The estimation and threshold module 127 may estimate actual terminal voltages Va, Vb and Vc of the inverter circuit 188 such that the inverter terminal voltages (Va*, Vb* and Vc*) accurately resemble the actual output terminal voltages (Va, Vb and Vc. The estimation and threshold module 127 may further provide terminal voltage threshold.

In an example embodiment, the motor 117 may include an interior permanent magnet (IPM) machine or a synchronous IPM machine (IPMSM).

The sensor 115 (e.g., shaft or rotor speed detector) may include one or more of the following: a direct current motor, an optical encoder, a magnetic field sensor (e.g., Hall Effect sensor), magneto-resistive sensor, and a resolver (e.g., a brushless resolver). In one configuration, the sensor 115 includes a position sensor, where raw position data and associated time data are processed to determine speed or velocity data for the motor shaft 126. In another configuration, the sensor 115 includes a speed sensor, or the combination of a speed sensor and an integrator to determine the position of the motor shaft.

In yet another example embodiment, the sensor 115 includes an auxiliary, compact direct current generator that is coupled mechanically to the motor shaft 126 of the motor 117 to determine speed of the motor shaft 126, where the direct current generator produces an output voltage proportional to the rotational speed of the motor shaft 126. In still another configuration, the sensor 115 includes an optical encoder with an optical source that transmits a signal toward a rotating object coupled to the motor shaft 126 and receives a reflected or diffracted signal at an optical detector, where the frequency of received signal pulses (e.g., square waves) may be proportional to a speed of the motor shaft 126. In an additional configuration, the sensor 115 includes a resolver with a first winding and a second winding, where the first winding is fed with an alternating current, where the voltage induced in the second winding varies with the frequency of rotation of the rotor.

Figure 2:
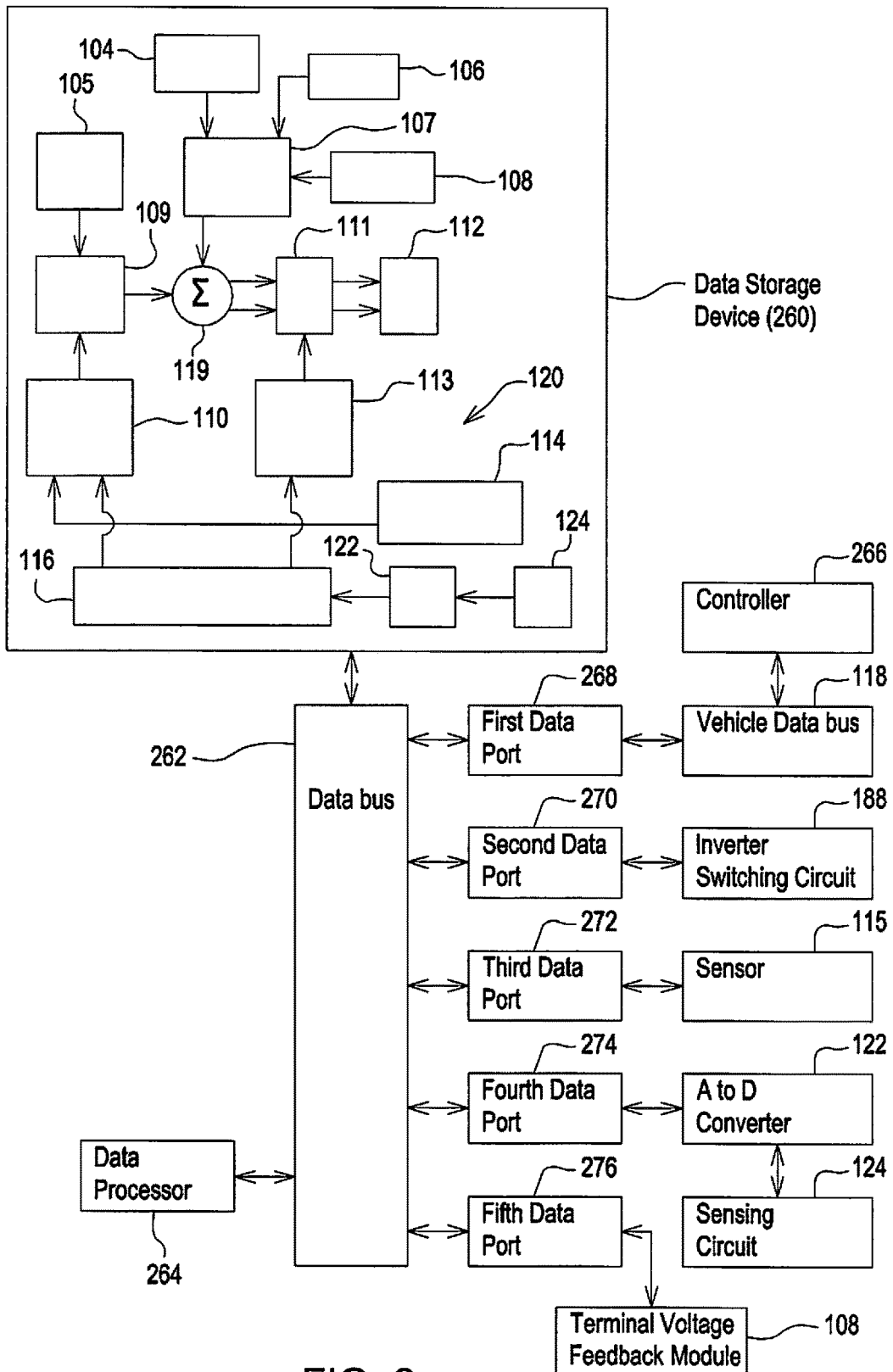

FIG. 2 is a block diagram of an electronic data processing system consistent with FIG. 1, according to an example embodiment. In FIG. 2, the electronic data processing system 120 includes an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In an example embodiment, the data processor 264 may include an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 260 may include any magnetic, electronic, or optical device for storing data. For example, the data storage device 260 may include an electronic data storage device, an electronic memory, non-volatile electronic random access memory, one or more electronic data registers, data latches, a magnetic disc drive, a hard disc drive, an optical disc drive, or the like.

As shown in FIG. 2, the data ports include a first data port 268, a second data port 270, a third data port 272, a fourth data port 274 and a fifth data port 276. While in FIG. 2, 5 data ports are shown, any suitable number of data ports may be used. Each data port may include a transceiver and buffer memory, for example. In an example embodiment, each data port may include any serial or parallel input/output port.

In an example embodiment as illustrated in FIG. 2, the first data port 268 is coupled to the vehicle data bus 118. In turn, the vehicle data bus 118 is coupled to a controller 266. In one configuration, the second data port 270 may be coupled to the inverter circuit 188; the third data port 272 may be coupled to the sensor 115; the fourth data port 274 may be coupled to the analog-to-digital converter 122; and the fifth data port 276 may be coupled to the terminal voltage feedback module 108. The analog-to-digital converter 122 is coupled to the sensing circuit 124.

In an example embodiment of the data processing system 120, the torque command generation module 105 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the torque command generation module 105 via the first data port 268. The operator of a vehicle may generate the torque commands via a user interface, such as a throttle, a pedal, the controller 266, or other control devices.

In one example embodiment, the PWM generation module 112 may communicate with the inverter switching circuit 188 and/or the data processor 264 via the second data port 270. In some example embodiments, the sensor 115 may communicate with the primary processing module 114 and/or the data processor 264 via the third data port 272. In one example embodiment, the analog-to-digital converter 122 may communicate with the sensing circuit 124 and/or the data processor 264 via the fourth data port 274. In one example embodiment, the terminal voltage feedback module 108 may communicate with the data processor 264 via the fifth data port 276.

At least one example embodiment provides a method to reduce over voltage spike and under-voltage sag during fast transients in a system with multiple inverters connected across common DC bus that has reduced energy storage devices, such as, DC bus capacitor. Example embodiments are at least applicable to inverters operating at higher switching frequency and increase power density by reducing the DC bus capacitor size.

Example embodiments enable a reduction in size and capacity of the DC bus capacitor, thus, reducing the overall size of the inverter and protecting the DC bus from high voltage sag or swell under severe load transient.

FIG. 3 illustrates a drive system according to an example embodiment. As shown in FIG. 3, a generator 300 is connected to an inverter 328. In the example of FIG. 3, the generator 300 is a diesel engine 305 couple to an electric machine rotor 310. However, example embodiments are not limited thereto. For example, the generator 300 may be a three phase grid.

The drive system of FIG. 3 also includes n traction devices $380_1$-$380_n$ coupled to n inverters $360_1$-$360_n$, respectively. In the example of FIG. 3, the multiple traction devices $380_1$-$380_n$ are motors. However, example embodiments are not limited thereto. The traction devices $380_1$-$380_n$ are active loads connected to a DC bus. Other examples of active loads that may be used are a DC to DC converter charging a battery and a three phase inverter powering a passive load.

The generator 300 and traction devices $380_1$-$380_n$ are connected to a same DC bus 350.

The inverter 328 may be configured as an AC-DC converter to convert three-phase AC power from the generator 300 into DC power for the DC bus 350, and vice versa. For each phase A, B and C of the voltage provided by the generator 300, two switch packages (e.g., S1 and S2 for phase A) are placed across the DC supply, and are switched on and off to generate the three phases from the generator 300 to the DC bus 350. Each switch package S1-S6 includes a diode and a transistor such as an insulated-gate bipolar transistor (IGBT) or a MOSFET transistor. Respective switch packages S1-S6 may be coupled to a respective one of the generator 300 phase windings to convert AC power from the respective winding into DC power on the DC bus 350. The inverter 328 may be operated in reverse if the generator 300 is to operate as a motor.

The inverter 328 is controlled by a generator controller 330, which may include gate drivers and an analog-to-digital converter (ADC) 334, a microprocessor 332 coupled electrically to the gate drivers 334, and a memory 336 coupled electrically to the microprocessor 336 and having stored therein operating instructions for the microprocessor 332. Each transistor is coupled electrically to a respective gate driver that is dedicated to that transistor and may provide a low DC voltage (e.g., 24 VDC) to turn on and off that transistor. The gate drivers 334 are under the control of the microprocessor 332, which may employ a pulse-width-modulation control scheme to control those gate drivers to supply electric energy on the DC bus 350 in the generating mode of the generator 300 and remove electric energy from the DC bus 350 in the motoring mode of the generator 300. In example embodiments, space vector modulation may be used. However, it should be understood, that any known pulse-width-modulation scheme for drive systems may be used. Thus, for the sake of brevity, the pulse-width-modulation scheme will not be described in greater detail.

The traction devices $380_1$-$380_n$ may have three phase windings $a_1$-$a_n$, $b_1$-$b_n$ and $c_1$-$c_n$. Each inverter $360_1$-$360_n$ is coupled electrically between the traction devices $380_1$-$380_n$ and the DC bus 350. The inverters $360_1$-$360_n$ may be configured, for example, as DC-AC inverters to convert DC power from the DC bus 350 into three-phase AC power for the traction devices $380_1$-$380_n$, and vice versa. For each phase of the voltage, $a_1$-$a_n$, $b_1$-$b_n$ and $c_1$-$c_n$ a pair of high-side and low-side switch packages (e.g., S11 and S21) are placed in series across the DC supply bus, and are switched on and off to generate the power across each phase winding.

As used in this document, switch states indicate whether a properly functioning or unimpaired semiconductor device is active ("on" or "closed") or inactive ("off" or "open"). A failure of a semiconductor device to change states may result in a semiconductor device failing in an open state or a closed state, for example.

The inverters $360_1$-$360_n$ may include pairs of high-side and low-side switch packages (S11-S21, S31-S41, S51-S61, S1n-S2n, S3n-S4n and S5n-S6n). Each switch package S11-S6n includes a diode and a transistor. Pairs of switch packages may be respectively coupled electrically to the traction device phase windings. For example, the pair of switch packages S11-S21 is connected to the traction device phase winding a1. The pairs of switch packages S11-S21, S31-S41, S51-S61, S1n-S2n, S3n-S4n and S5n-S6n enable individual control of each individual phase of the phase windings a1-cn.

The inverters $360_1$-$360_n$ may be operated in reverse if the traction devices $380_1$-$380_n$ are to operate as generators.

The inverters $360_1$-$360_n$ are controlled by controllers $365_1$-$365_n$, respectively. The controllers $365_1$-$365_n$ may each be in the system illustrated in FIG. 2 as part of the controller 266 or the data processor 264 configured to execute the computer-readable instructions stored in the data storage device 260 (e.g., instructions to execute the functions of the data processing system 120). The generator controller 330 for inverter 328 also resides in the same processor/controller as the controllers $365_1$-$365_n$.

The controllers $365_1$-$365_n$ may include gate drivers and an analog-to-digital converter (ADC) 369, a microprocessor 367 coupled electrically to the gate drivers 369, a memory 371 coupled electrically to the microprocessor 336 and having stored therein operating instructions for the microprocessor 367, and a voltage sensor 373. However, it should be understood that a single voltage sensor 373 may provide a measured DC bus voltage $V_{DC}^{Meas}$ to the controllers $365_1$-$365_n$ instead of a voltage sensor as part each of the controllers $365_1$-$365_n$.

Each transistor is coupled electrically to a respective gate driver that is dedicated to that transistor and may provide a low DC voltage (e.g., 24 VDC) to turn on and off that transistor. The gate drivers 369 are under the control of the microprocessor 367, which may employ a pulse-width-modulation control scheme to control those gate drivers to supply electric energy on the DC bus 350 in the generating mode of the generator 300 and remove electric energy from the DC bus 350 in the motoring mode of the generator 300.

The DC bus 350 may be configured, for example, as a bank of capacitors.

In a back to back dual inverter system such as the system shown in FIG. 3, the DC bus capacitor has at least two functions. In steady state, the DC bus capacitor provides a low impedance path for a high frequency ripple current to flow. Under dynamic load changes, the DC bus capacitor provides sufficient and accurate energy to the traction drive, before the generator drive can respond.

The energy stored in the DC capacitor is $\frac{1}{2}CV^2$ where C is the capacitance of the DC bus capacitor and V is the voltage of the DC bus capacitor.

Hence, reducing the size of the DC bus capacitor reduces the stored energy on the DC bus. Thus, during dynamic load changes on the traction device, a higher value of sag and swell in the DC bus voltage occur as the capacitance is reduced.

Meanwhile the generator and the traction device can have very different design. The generator may be designed for near fixed speed operation at higher rpm. The traction device may be designed for high torque delivery at low rpm. Thus, the generator and the traction device may end up having very different dynamic response.

If the traction device reacts faster to a load step up, than the generator, a DC bus voltage sag will be observed. If the generator reacts faster than the traction device for the same load step up, a DC bus voltage swell will be observed. This sag or swell will become more severe where the size of the DC bus capacitor is reduced.

Consequently, example embodiments match (or substantially match) the dynamic response for the traction device and the generator. This can be achieved by matching the current regulator bandwidths of the traction device and the generator. Bandwidth is an inverse of the rise time. Rise time is a time the actual current takes to reach 90% of a reference value when the system is excited by a step input function or pulse. Thus, the current regulator bandwidth is based on measurements of current rise time in response to a step input function or pulse.

Additionally, any delay in current commands between the traction device and the generator are reduced (and/or removed) in order to better improve the performance.

Example embodiments maintain a constant DC bus voltage (without appreciable sag and swell) without the involvement of additional hardware.

When deploying the traction device and the generator, a set of field-measured d-axis and q-axis inductance values of the traction device and a set of field-measured d-axis and q-axis inductance values for the generator may be used to embodiments match (or substantially match) the dynamic response for the traction device and the generator. The current controller may compare stored inductance values for the traction device with the set of field-measured d-axis and q-axis inductance values of the traction device and adjust a set of gains for the traction device to compensate for the difference between the inductance values. Moreover, the current controller may compare stored inductance values for the generator with the set of field-measured d-axis and q-axis inductance values for the generator and adjust a set of gains for the generator to compensate for the difference between the inductance values.

For example, the first and second inductances for the machine are determined based on a stored or known machine characterization process (e.g., during a factory characterization process by the manufacturer) or manufacturer specifications of the generator, machine and/or motor, where the machine characterization may be done in motor-generator back-to-back configuration with two identical machines where one machine operates as a generator while the other machine operates as a motor. The manufacturer can store the first and second inductances of the machine characterization process in memory or a data storage device (e.g., nonvolatile electronic memory) of the data processing system, or the user may program the first and second inductances into the memory or data storage device of the data processor during setup or commissioning of the machine. Alternately or cumulatively with the machine characterization process or factory-stored estimated values of the first and second inductances, in the field at regular intervals (e.g., user-defined intervals pursuant to a diagnostic test of the machine) the data processor can estimate the first and second inductance based on the commanded torque (in the motoring mode), sensed rotor velocity and torque, permanent magnet parameters (for a permanent magnet machine), and measurements of the three phase currents and voltages, which are converted by inverse Park transformation in to d-axis inductance values and q-axis inductance values in accordance with appropriate machine equations.

Figure 4A:
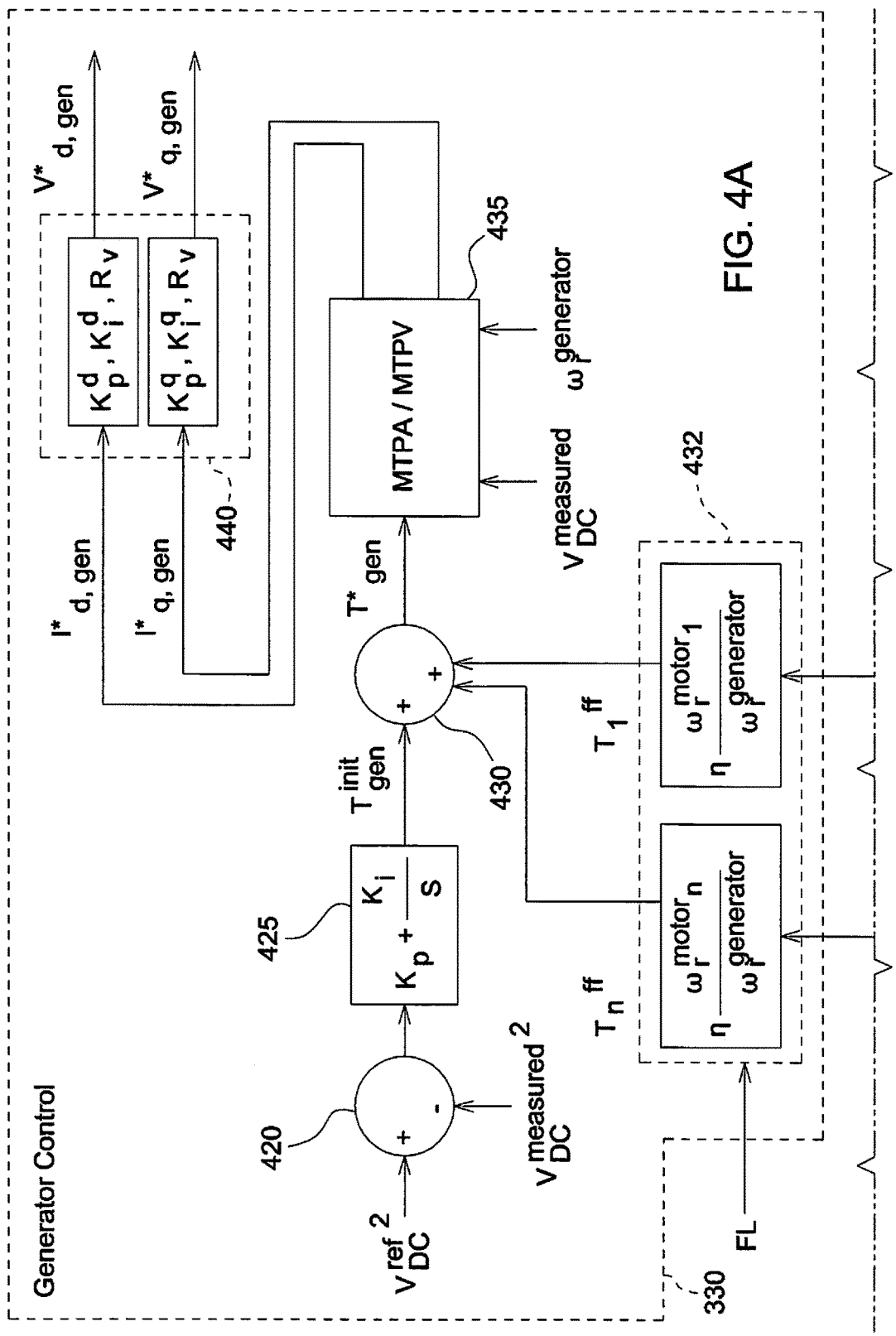
FIGS. 4A-4B illustrates a control diagram according to an example embodiment.
Figure 4B:
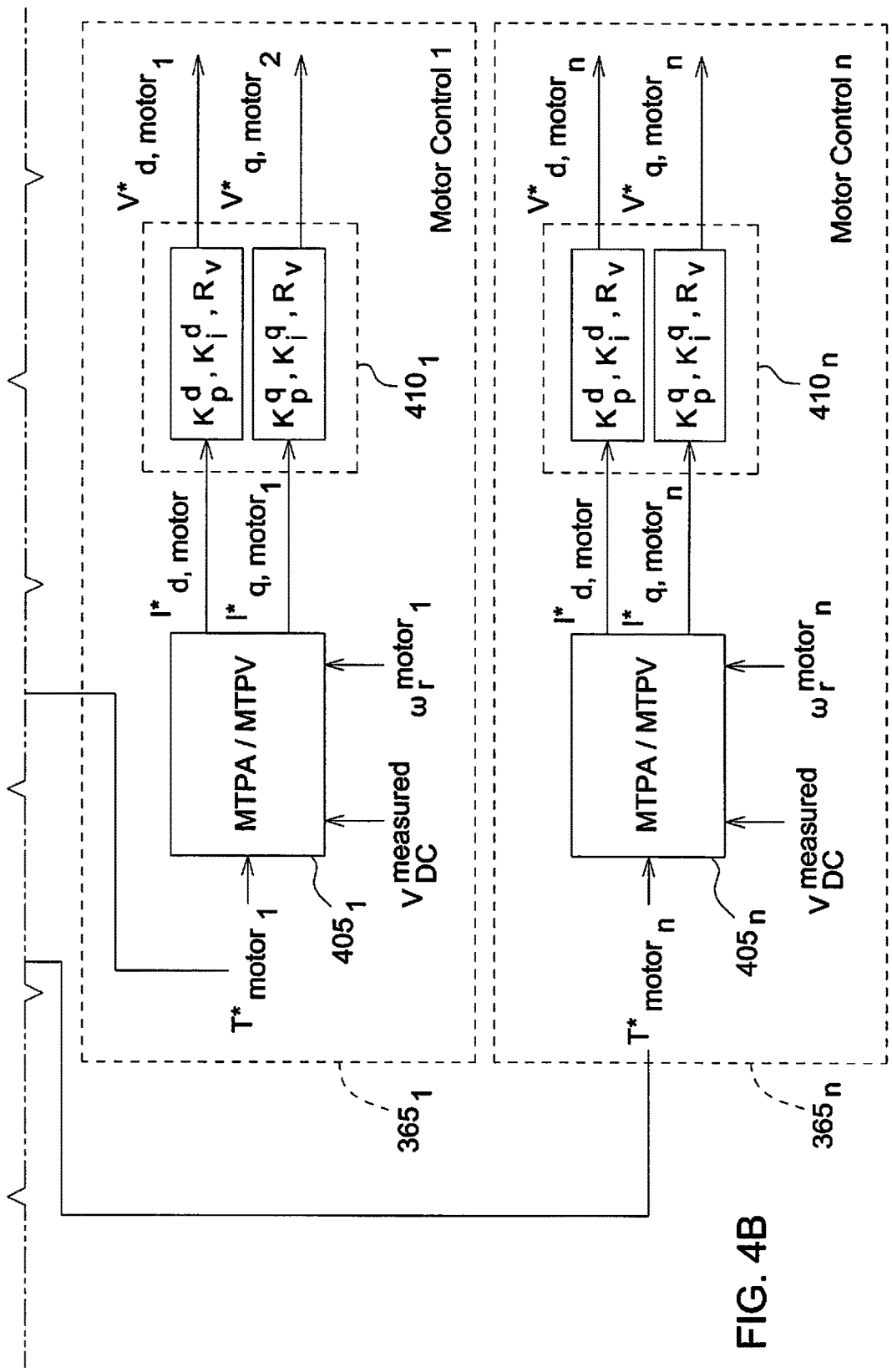

FIGS. 4A-4B illustrates a control diagram according to an example embodiment. The control diagram of FIGS. 4A-4B may be performed by the generator controller 330 and the controllers $365_1$-$365_n$. In the control diagram of FIGS. 4A-4B, the generator 300 operates in a voltage control mode and the traction device $380_1$-$380_n$ operate in a torque mode.

As shown in FIGS. 4A-4B, each of the controllers $365_1$-$365_n$ includes a current command generator $405_1$-$405_n$ and a voltage command generator $410_1$-$410_n$. Each of the current command generators $405_1$-$405_n$ may perform the functionality of the summer 119, the calculation module 110 and d-q axis current generation manager 109 (e.g., d-q axis current generation look-up tables). More specifically, for each traction device j, the current command generator $405_j$ receives a torque command for the jth traction device $T^*_j$, the measured DC bus voltage $V_{DC}^{Meas}$ and a speed of a rotor of the jth traction device $\omega_r^j$. The measured DC bus voltage $V_{DC}^{Meas}$ may be generated by the voltage sensor 373 coupled to the DC bus to measure the DC bus voltage.

Using the torque command for the jth traction device $T^*_j$, the measured DC bus voltage $V_{DC}^{Meas}$ and the speed of the rotor of the jth traction device $\omega_r^j$, the current command generator $405_j$ generates d-q axis current comments $i^*_{d,j}$ and $i^*_{q,j}$ using MTPA (maximum torque per amp) and/or MTPV (maximum torque per volt) curves. Each traction device $380_1$-$380_n$ has its own MTPA and MTPV curves.

During motor characterization, multiple current commands are used at different speed points, which generates the MTPA (maximum torque per amp) and MTPV (maximum torque per volt) curves. Generally, motor characterization is a procedure used to determine d-axis and q-axis commands for a specific speed and torque command. The procedure is repeated at multiple torque commands and multiple speeds. Any know motor characterization procedure may be used.

Each of the voltage command generators $410_1$-$410_n$ may perform the functionality of the current regulation controller 111. More specifically, for each traction device j, the voltage command generator $410_j$ receives the d-q axis current comments $i^*_{d,j}$ and $i^*_{q,j}$ and generates d-q axis voltage commands $v^*_{d,j}$ and $v^*_{q,j}$ based on the d-q axis current comments is $i^*_{d,j}$ and $i^*_{q,j}$, current regulator gains $K_{p,j}^d$, $K_{p,j}^q$, $K_{i,j}^d$ and $K_{i,j}^q$, where i indicates an integral gain and p indicates a proportional gain, and a virtual active feedback $R_{v,j}$. The virtual active feedback $R_{v,j}$ may be a desired and/or predetermined value such as $10R_{s,j}$ or $20R_{s,j}$, where $R_{s,j}$ is a stator resistance of the jth traction device. The gains $K_{p,j}^d$, $K_{p,j}^q$, $K_{i,j}^d$ and $K_{i,j}^q$ are unique to each of the traction devices $380_1$-$380_n$.

The controller $365_j$ measures steady state d and q axes inductances $L_{d,j}$ and $L_{q,j}$ of the jth traction motor by measuring a d-q axis machine terminal voltage $V_{d,j}$, $V_{q,d}$ and currents and follows:

$$V_{q,j} = R_{s,j} i_{q,j} + \omega_{r,j} L_{d,j} i_{d,j} + \omega_{r,j} \lambda_{f,j} \quad (1)$$

$$V_{d,j} = R_{s,j} i_{d,j} - \omega_{r,j} L_{q,j} i_{q,j} \quad (2)$$

where the d-q axis machine terminal voltage $V_{d,j}$, $V_{q,j}$ are quantities estimated in the controller (e.g., using the estimation module 127), d-q axis currents $i_{q,j}$ and $i_{dm,j}$ are quantities measured from the three-phase current measurements (e.g., using the secondary processing module 116), $R_{s,j}$ is the stator resistance, $\lambda_{f,j}$ is a back electromotive force (emf) for the traction device j and $\omega_{r,j}$ is the speed of the rotor shaft.

The controller $365_j$ calculates the current regulator gains $K_{p,j}^d$, $K_{p,j}^q$, $K_{i,j}^d$ and $K_{i,j}^q$ based on the measured d and q axes inductances $L_{d,j}$ and $L_{q,j}$ and the current regulator bandwidths as follows:

$$K_{p,j}^d = 2\pi f_{BW} L_{d,j} \quad (3)$$

$$K_{p,j}^q = 2\pi f_{BW} L_{q,j} \quad (4)$$

$$K_{i,j}^d = 2\pi f_{BW} (R_{s,j} + R_{v,j}) \quad (5)$$

$$K_{i,j}^q = 2\pi f_{BW} (R_{s,j} + R_{v,j}) \quad (6)$$

where $f_{BW}$ is the desired current regulator bandwidth. The desired current regulator bandwidth $f_{BW}$ may be between 150-200 Hz and is based on a dynamic torque response.

In another example embodiment, the desired current regulator bandwidth $f_Bw$ for each of the tractions devices $360_1$-$360_n$ and the generator 300 may be tuned to reduce an effect of load change on the DC bus. The desired current regulator bandwidth $f_{BW}$ is the same for the tractions devices $360_1$-$360_n$ and the generator 300. D and q axes inductances may be determined at different operating points for each traction device j and the d and q axes inductances $L_{d,j}$ and $L_{q,j}$ may be an average of the d and q axes inductances that are determined at the different operating points. The current regulator gains $K_{p,j}{}^d$, $K_{p,j}{}^q$, $K_{i,j}{}^d$ and $K_{i,j}{}^q$ can then be determined using the average values of the d and q axes inductances and the tuned current regulator bandwidths.

After current regulator gains $K_{p,j}{}^d$, $K_{p,j}{}^q$, $K_{i,j}{}^d$, and $K_{i,j}{}^q$ are determined for each individual traction drive, the controller 365, may verify if the actual current regulator bandwidths are equal to set bandwidths at different operating points.

The generator controller 330 includes a subtractor 420, a proportional-integral (PI) controller 425, a summer 430, a current command generator 435 and a voltage command generator 440.

The subtractor 420 takes a difference between the measured DC bus voltage squared $[V_{dc}{}^{measured}]^2$ and a reference DC bus voltage squared $[V_{dc}{}^{ref}]^2$ (e.g., $V_{dc}{}^{ref}$ of 700V) and outputs the difference or error to the PI controller 425. The PI controller 425 then generates an initial torque command value $T_{gen}{}^{init}$ based on the difference or error. The PI controller 425 generates the initial torque command $T_{gen}{}^{init}$ as follows:

$$T_{gen}{}^{init} = K_{p,vdc} * ((V_{dc}{}^{ref})^2 - (V_{dc}{}^{measured})^2) + K_{i,vdc} * (\int [(V_{dc}{}^{ref})^2 - (V_{dc}{}^{measured})^2] dt) \quad (7)$$

$K_{p,vdc}$ and $K_{i,vdc}$ are gains that are based on empirical data. Gains $K_{p,vdc}$ and $K_{i,vdc}$ are set up to achieve a tunable command tracking bandwidth of a voltage loop and load disturbance rejection capability. This tunable command tracking capability of the voltage loop may be less than a bandwidth of a current loop by a factor of around 5.

The summer 430 sums the initial torque command value $T_{gen}{}^{init}$ of the PI controller 425 with feedforward torque commands $T_1{}^{ff}$-$T_n{}^{ff}$ based on the torque commands $T^*_1$-$T^*_n$ from the controllers $365_1$-$365_n$ to generate a torque command for the generator $T^*_{gen}$.

More specifically, the generator controller 330 further includes a feedforward manager 432. The feedforward manager 432 receives the torque commands $T^*_j$ and generates the feedforward torque commands $T_j{}^{ff}$ as follows:

$$T_j^{ff} = T_j^* \left( \eta_j \frac{\omega_r^j}{\omega_r^{gen}} \right) \quad (8)$$

where $\eta_j$ is an efficiency factor for the traction device. The efficiency factor $\eta_j$ is based on machine losses at various operating points.

The current command generator 435 may perform the functionality of the summer 119, the calculation module 110 and d-q axis current generation manager 109 (e.g., d-q axis current generation look-up tables). More specifically, current command generator 435 receives the, the measured DC bus voltage $V_{DC}{}^{Meas}$ and a speed of a rotor of the generator $\omega_r^{gen}$.

Using torque command for the generator $T^*_{gen}$, the measured DC bus voltage $V_{DC}{}^{Meas}$ and a speed of a rotor of the generator $\omega_r^{gen}$, the current command generator 435 generators d-q axis current comments $i^*_{d,gen}$ and $i^*_{q,gen}$ using MTPA (maximum torque per amp) and/or MTPV (maximum torque per volt) curves for the generator 300.

The output from the current command generator 435 is synchronized with the outputs from the current command generators $405_1$-$405_n$. Using a processor with sequential execution, the current command generators $405_1$-$405_n$ are executed first and then the current command generator 435 is executed in a same $k^{th}$ step.

Using a processor with parallel execution, the current command generator 435 and the current command generators $405_1$-$405_n$ may be operating at the same time. This may be performed in a same controller synchronized with the same high frequency clock. Moreover, a flag FL may be used to indicate that the feedforward torque commands $T_1{}^{ff}$-$T_n{}^{ff}$ from the traction drives have been updated in the feedforward manager 432. Once the flag FL indicates that the feedforward torque commands $T_1{}^{ff}$-$T_n{}^{ff}$ from the traction drives have been updated, the execution of the subtractor 420, the proportional-integral (PI) controller 425, the summer 430 and the current command generator 435 may begin. For example, the generator controller 330 may monitor the reception of the feedforward torque commands $T_1{}^{ff}$-$T_n{}^{ff}$ and the flag FL may be generated by the generator controller 330, for example. Moreover, the voltage command generators $410_1$-$410_n$ and the voltage command generator 440 are synchronized by the same high frequency clock.

Using a processor with serial execution only the entire control scheme will be required to be executed sequentially. In the kth step, the current command generators for the traction drives are to be executed first. For example for the $j^{th}$ traction drive, $405_j$ and $410_j$ are to be executed first together. After all the traction drives are executed ($405_j$ and $410_j$ for j=1 to n), the voltage control drive of the generator controller 330 will be executed from the subtractor 420 to the voltage command generator 440 (in the same kth step). That means in the end of the kth step, the output of the current regulators (outputs of the voltage command generators $410_1$-$410_n$ and 440) will all be synchronized for the $k^{th}$ step. In a processor with mixed execution methods, part of the algorithm may be executed sequentially and a part may be executed in parallel fashion. The current command generators $405_1$-$405_n$ may be executed sequentially and then the current command generator 435 may be executed. The voltage command generators $410_1$-$410_n$ and the voltage command generator 440 are then synchronized by a same high frequency clock in parallel execution mode.

The voltage command generator 440 may perform the functionality of the current regulation controller 111. More specifically, the voltage command generator 440 receives the d-q axis current comments $i^*_{d,gen}$ and $i^*_{q,gen}$ and generates d-q axis voltage commands $v^*_{d,gen}$ and $v^*_{q,gen}$ based on the d-q axis current comments $i^*_{d,gen}$ and $i^*_{q,gen}$, current regulator gains $K_{p,gen}{}^d$, $K_{p,gen}{}^q$, $K_{i,gen}{}^d$ and $K_{i,gen}{}^q$ and a virtual active feedback $R_{v,gen}$. The virtual active feedback $R_{v,gen}$ may be a desired and/or predetermined value such as $10R_{s,gen}$ or $20R_{s,gen}$, where $R_{s,gen}$ is a stator resistance of the generator 300.

The generator controller 330 also calculates current regulator gains $K_{p,gen}{}^d$, $K_{p,gen}{}^q$, $K_{i,gen}{}^d$ and $K_{i,gen}{}^q$ based on measured d and q axes inductance $L_{d,gen}$ and $L_{q,gen}$ using equations (1)-(6), where "gen" indicates parameters for the generator as opposed to a jth traction device.

The current regulator gains $K_{p,gen}{}^d$, $K_{p,gen}{}^q$, $K_{i,gen}{}^d$ and $K_{i,gen}{}^q$ and $K_{p,j}{}^d$, $K_{p,j}{}^q$, $K_{i,j}{}^d$ and $K_{i,j}{}^q$ may be adjusted to account for parameter mismatch specially the machine inductances for the generator 300 and the traction devices $380_1$-$380_n$ when the generator 300 and the traction devices $380_1$-$380_n$ are deployed such that the current regulator bandwidths of the generator 300 and the traction devices $380_1$-$380_n$ are the same or substantially similar (e.g., within 10%).

For example, when deploying the tractions devices $360_1$-$360_n$ and the generator 300, a set of field-measured d-axis and q-axis inductance values of the traction devices $360_1$-$360_n$ and a set of field-measured d-axis and q-axis inductance values for the generator 300 may be used to match (or substantially match) the dynamic current response for the traction devices $360_1$-$360_n$ and the generator 300. The gains $K_{p,j}^d$, $K_{p,j}^q$, $K_{i,j}^d$ and $K_{i,j}^q$ may be adjusted to compensate for a difference between the inductances $L_{d,j}$ and $L_{q,j}$ and the set of field-measured d-axis and q-axis inductance values of the traction device $360_j$.

Similarly, the current regulator gains $K_{p,gen}^d$, $K_{p,gen}^q$, $K_{i,gen}^d$ and $K_{i,gen}^q$ may be adjusted to compensate for a difference between the inductance values $L_{d,gen}$ and $L_{q,gen}$ and a set of field-measured d-axis and q-axis inductance values for the generator 300.

The output of the voltage command generator 440 (i.e., the d-q axis voltage commands $v^*_{d,gen}$ and $v^*_{q,gen}$) and the output of the voltage command generators $410_1$-$410_n$ (i.e., the d-q axis voltage commands for the controllers $365_1$-$365_n$) are synchronized.

The traction drive torque command are updated to the inverter in voltage control mode in the same step such that there is a reduced (or no) delay in the voltage control generated torque command.

Figure 5:
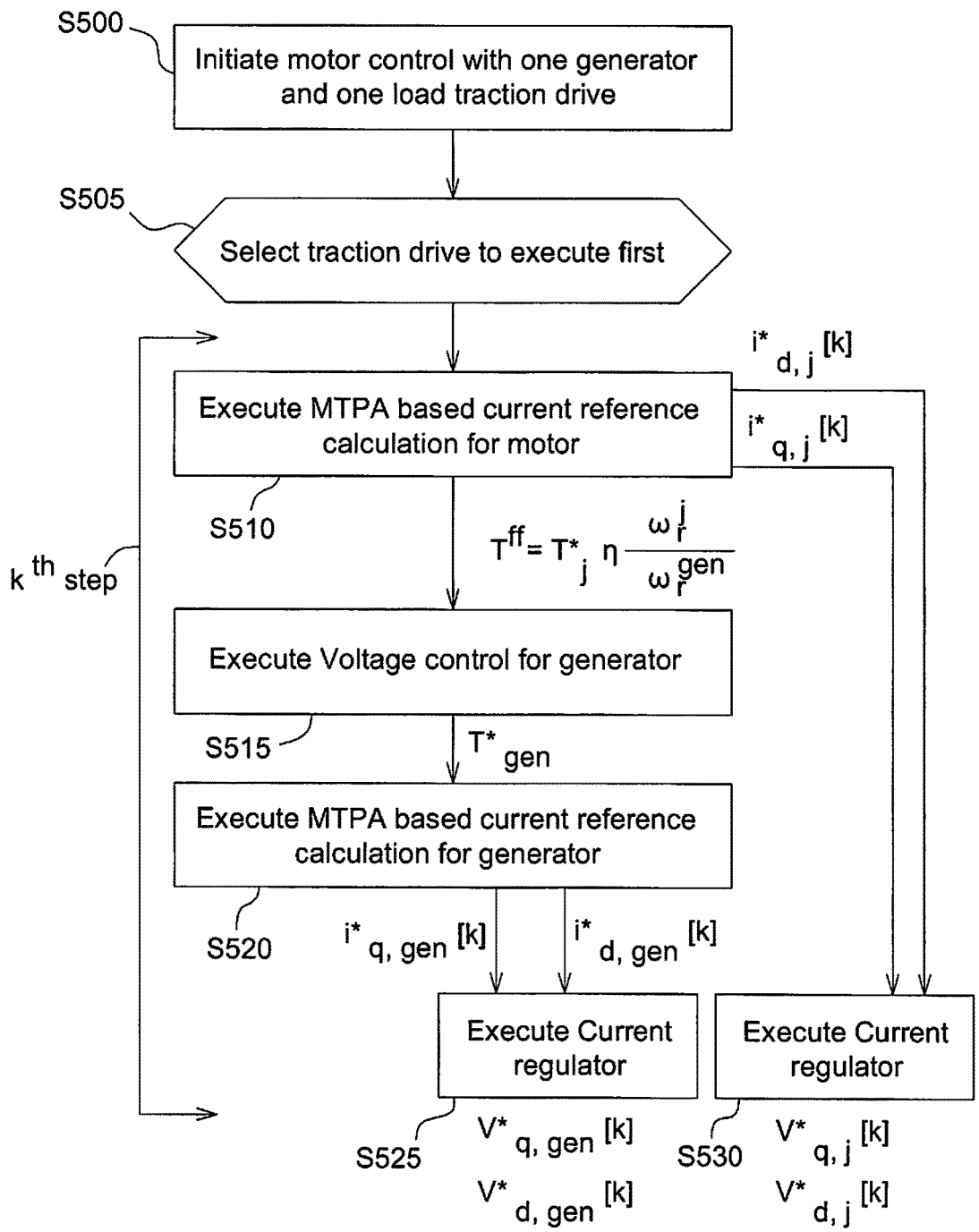

FIG. 5 illustrates a method of reducing delay in a feedforward torque command according to an example embodiment. In the method of FIG. 5, a single traction device is driven at a time. The method of FIG. 5 may be performed by the system shown in FIG. 3.

At S500, the system is initiated. An initial state may be such that the traction drive has not commanded any torque yet or is holding the last commanded torque. The generator drive is regulating the DC bus voltage at no load or providing the power required by the traction drive from the last commended torque. In the method of FIG. 5, all traction drives are in a torque control mode to generate At S505, one of the traction devices is selected to be driven. The selected traction device operates in a torque control mode to generate a feedforward torque command feedforward torque command. A generator side inverter is in voltage control mode to control the voltage of the DC bus.

At the beginning of the $k^{th}$ step at S510, the controller of the selected traction device generates d-q axes current commands for the traction device. For example, when the jth traction device is selected, using a torque command for the jth traction device $T^*_j$ from a user, the measured DC bus voltage $V_{DC}^{Meas}$ and the speed of the rotor of the ith traction device $\omega_r^j$, the current command generator $405_j$ generates d-q axis current comments $i^*_{d,j}[k]$ and $i^*_{q,j}[k]$ using MTPA (maximum torque per amp) and/or MTPV (maximum torque per volt) curves.

While the controller for the traction device determines d-q axis current commands $i^*_{d,j}[k]$ and $i^*_{q,j}[k]$ (based on the traction drive torque command and the MTPA and MTPV curves), the controller for the generator determines the feedforward torque command $T_j^{ff}[k]$ using equation (8).

At S515, the controller for the generator performs voltage control by determining torque command for the generator $T^*_{gen}$. For example, the voltage control at S515 may correspond to the functions performed by the subtractor 420, the PI controller 425 and the summer 430. The summer 430 sums an output of the PI controller 425 with a feedforward torque command $T_j^{ff}$ based on the torque commands $T^*_j$ from the motor controller $365_j$ to generate a torque command for the generator $T^*_{gen}$.

At S520, the controller for the generator generates d-q axes current commands for the generator. For example, using torque command for the generator $T^*_{gen}$, the measured DC bus voltage $V_{DC}^{Meas}$ and a speed of a rotor of the generator $\omega_r^{gen}$, the current command generator 535 generators d-q axis current comments $i^*_{d,gen}[k]$ and $i^*_{q,gen}[k]$ using MTPA (maximum torque per amp) and/or MTPV (maximum torque per volt) curves for the generator 300.

At S525, the controller for the generator generates d-q axis voltage commands $v^*_{d,gen}[k]$ and $v^*_{q,gen}[k]$ based on the d-q axis current comments $i^*_{d,gen}[k]$ and $i^*_{q,gen}[k]$, measured currents $i_d$, $i_q$, current regulator gains $K_{p,gen}^d$, $K_{p,gen}^q$, $K_{i,gen}^d$ and $K_{i,gen}^q$ and a virtual active feedback $R_{v,gen}$.

At S530, the controller for the traction device generates d-q axis voltage commands $v^*_{d,j}[k]$ and $v^*_{q,j}[k]$ based on the d-q axis current comments $i^*_{d,j}[k]$ and $i^*_{q,j}[k]$, current regulator gains $K_{p,j}^d$, $K_{p,j}^q$, $K_{i,j}^d$ and $K_{i,j}^q$ and a virtual active feedback $R_{v,j}$.

In an example embodiment, S525 and S530 are performed synchronously.

Figure 6:
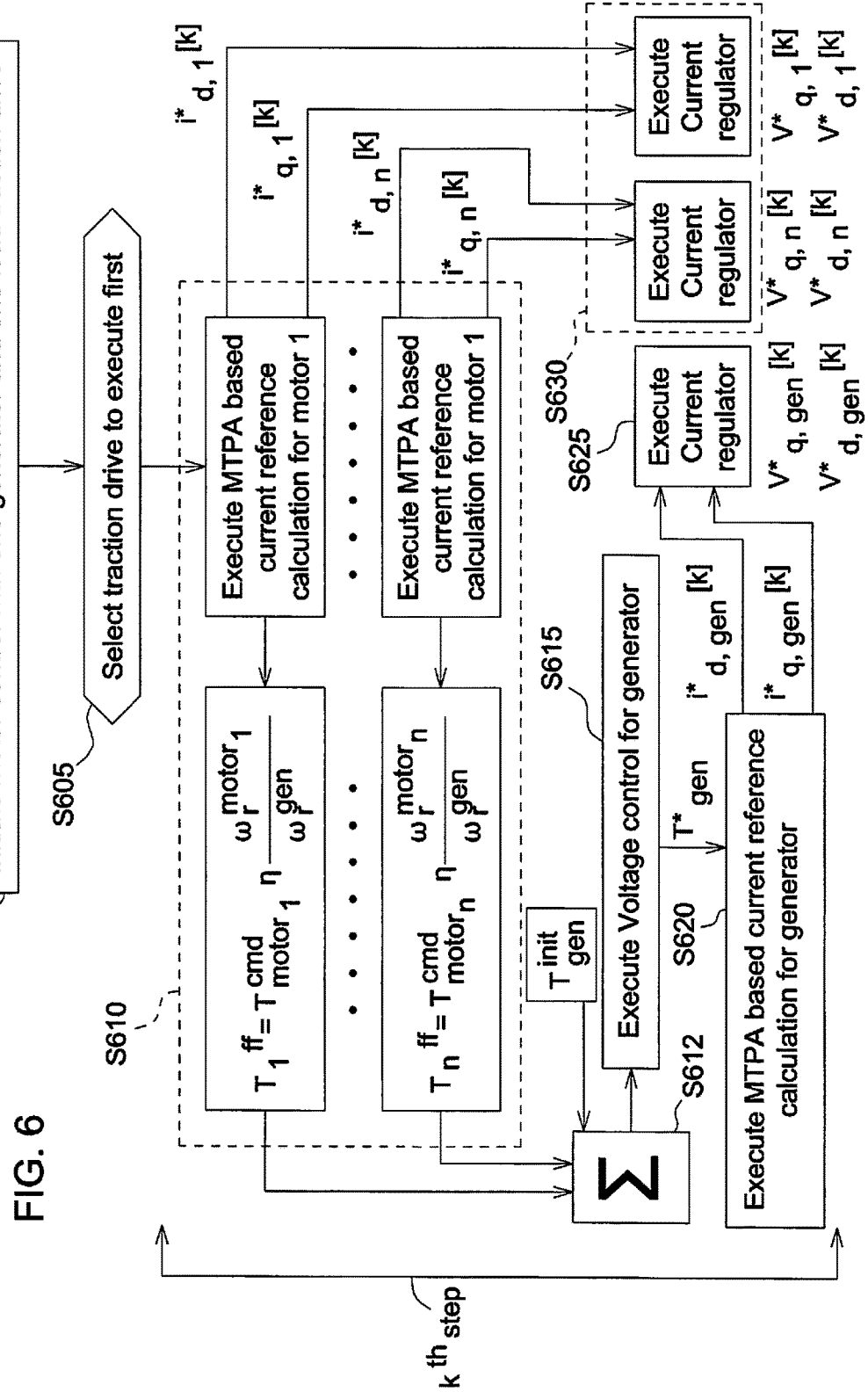

FIG. 6 illustrates method of reducing delay in a feedforward torque command according to an example embodiment. The method of FIG. 6 may be performed by the system shown in FIG. 3 and in accordance with the control diagram of FIGS. 4A-4B.

At S600, the system is initiated. As stated above, an initial state may be such that the traction drive has not commanded any torque yet or is holding the last commanded torque. The generator drive is regulating the DC bus voltage at no load or providing the power required by the traction drive from the last commended torque.

At S605, an order of execution of the traction devices is determined. The order may be predetermined, however, it should be understood example embodiments are not limited thereto.

For sequential controller execution, for a kth step of the controller execution, the current command generators $405_1$-$405_n$ of the traction drives are executed first in a sequential manner and then the current command generator 435 of the generator is executed in the voltage control mode so that by the end of kth execution step the most updated feedforward torque command signal has been provided to the voltage control drive (i.e., the generator). The voltage command generators $410_1$-$410_n$ of the traction drives and the voltage command generator 440 of the generator are synchronized by the same high frequency clock.

Using a processor with parallel execution, the generator side current command generator 420 to 440 the current command generators for the traction side ($405_1$ and $410_1$) may be operating at the same time. This may be performed in a same controller synchronized with the same high frequency clock. In another example embodiment, the entire functionality of the controllers may be implemented sequentially. For example, for a kth sequential step of the controller the current command generator $405_1$ and the voltage command generator $410_1$ may be executed and then a current command generator and a voltage command generator are executed for a next traction drive. The current command generator 435 and the voltage command generator 440 are then executed in the last operation of the kth step after the current command generators $405_1$-$405_n$ and the voltage command generators $410_1$-$410_n$ for all traction drives are executed.

At the beginning of the $k^{th}$ step at S610, the controller of the selected traction devices generate d-q axes current commands for the traction devices, respectively, in accordance with the order of execution. For example, when the jth traction device is selected, using the torque command for the jth traction device $T^*_j$, the measured DC bus voltage $V_{DC}^{Meas}$ and the speed of the rotor of the jth traction device $\omega_r^j$, the current command generator $405_j$ generates d-q axis current comments $i^*_{d,j}[k]$ and $i^*_{q,j}[k]$ using MTPA (maximum torque per amp) and/or MTPV (maximum torque per volt) curves. Thus, at S610, d-q axis current comments $i^*_{d,1}[k]$-$i^*_{d,n}[k]$ and $i^*_{q,1}[k]$-$i^*_{q,n}[k]$ are generated.

While the controller for the traction device determines d-q axis current comments $i^*_{d,y}[k]$ and $i^*_{q,y}[k]$, the controller for the generator determines the feedforward torque command $T_j^{ff}[k]$ using equation (8).

At S612, the controller for the generator sums the feedforward torque commands $T_1^{ff}$ to $T_n^{ff}$ and the initial torque command value. Ten generated by the controller for the generator.

At S615, the controller for the generator performs voltage control by determining torque command for the generator $T^*_{gen}$. For example, the summer 430 sums an output of the PI controller 425 with feedforward torque commands $T_1^{ff}$-$T_n^{ff}$ based on the torque commands $T^*_1$-$T^*_n$ from the controllers $365_1$-$365_n$ to generate a torque command for the generator $T^*_{gen}$.

At S620, the controller for the generator generates d-q axes current commands for the generator. For example, using torque command for the generator $T^*_{gen}$, the measured DC bus voltage $V_{DC}^{Meas}$ and a speed of a rotor of the generator $\omega_r^{gen}$, the current command generator 535 generators d-q axis current comments $i^*_{d,gen}[k]$ and $i^*_{q,gen}[k]$ using MTPA (maximum torque per amp) and/or MTPV (maximum torque per volt) curves for the generator 300.

At S625, the controller for the generator generates d-q axis voltage commands $v^*_{d,gen}[k]$ and $v^*_{q,gen}[k]$ based on the d-q axis current comments $i^*_{d,gen}[k]$ and $i^*_{q,gen}[k]$, current regulator gains $K_{p,gen}^d$, $K_{p,gen}^q$, $K_{i,gen}^d$ and $K_{i,gen}^q$ and a virtual active feedback $R_{v,gen}$.

At S630, the controllers for the traction devices generate d-q axis voltage commands $v^*_{d,1}[k]$-$v^*_{d,n}[k]$ and $v^*_{q,1}[k]$-$v^*_{q,n}[k]$ based on the d-q axis current comments $i^*_{d,y}[k]$-$i^*_{d,n}[k]$ and $i^*_{q,1}[k]$-$i^*_{q,n}[k]$ the current regulator gains and the virtual active feedback.

In the method of FIG. 6, the outputs of the current commands at S610 and the current commands at S620 may be synchronized and the outputs of S625 are S630 are synchronized. For example, the output from the current command generator 435 is synchronized with the outputs from the current command generators $405_1$-$405_n$ using parallel execution. Using a processor with sequential execution, the current command generators $405_1$-$405_n$ are executed first and then the current command generator 435 is executed in a same kth step.

Using a processor with parallel execution, the output from the current command generator 435 and the outputs from the current command generators $405_1$-$405_n$ are written at the same time. This may be performed in a same controller synchronized with the same high frequency clock.

Figure 7:
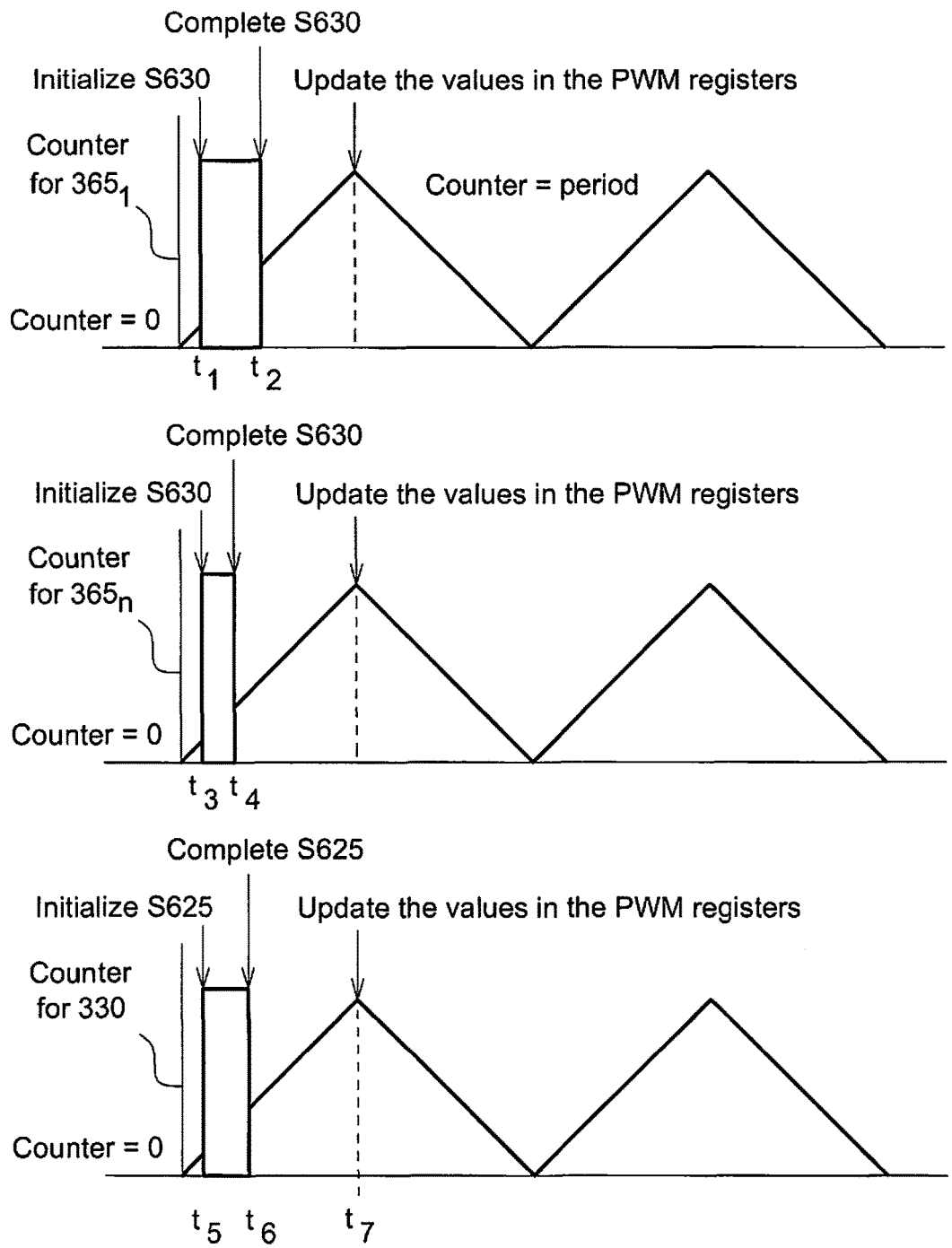

FIG. 7 illustrates a synchronized output for S625 and S630. Steps S630 and S625 may be implemented in the FPGA with parallel execution. Also, the execution of S630 and S625 are synchronized with high frequency carriers. Thus, if the carriers are synchronized then we will have synchronized execution of S630 and S625.

As shown in FIG. 7, the controller $365_1$ may start S630 at t1 and complete the determination of the voltage commands $v^*_{d,1}[k]$, $v^*_{q,1}[k]$ at time t2. The controller $365_n$ may start $S625_n$ at t3 and complete the determination of the voltage commands $v^*_{d,n}[k]$, $v^*_{q,n}[k]$ at time t4. Times t1 and t3 may the same or different and times t2 and t4 may be the same or different.

The generator controller 330 may start S620 at t5 and complete the determination of the voltage commands $v^*_{d,gen}[k]$ and $v^*_{q,gen}[k]$ at time t6. The initialization and completion of S625 may occur at the same time or different times as the controllers $365_1$-$265_n$ perform S630.

As shown in FIG. 7, pulse-width modulation (PWM) registers (e.g., in the storage device 260) are then synchronously updated at time t7.

Thus, in an example embodiment, S625 and S630 may be considered to be performed synchronously because the PWM registers for each controller $365_1$-$365_n$ and 330 are updated synchronously.

Figure 8:
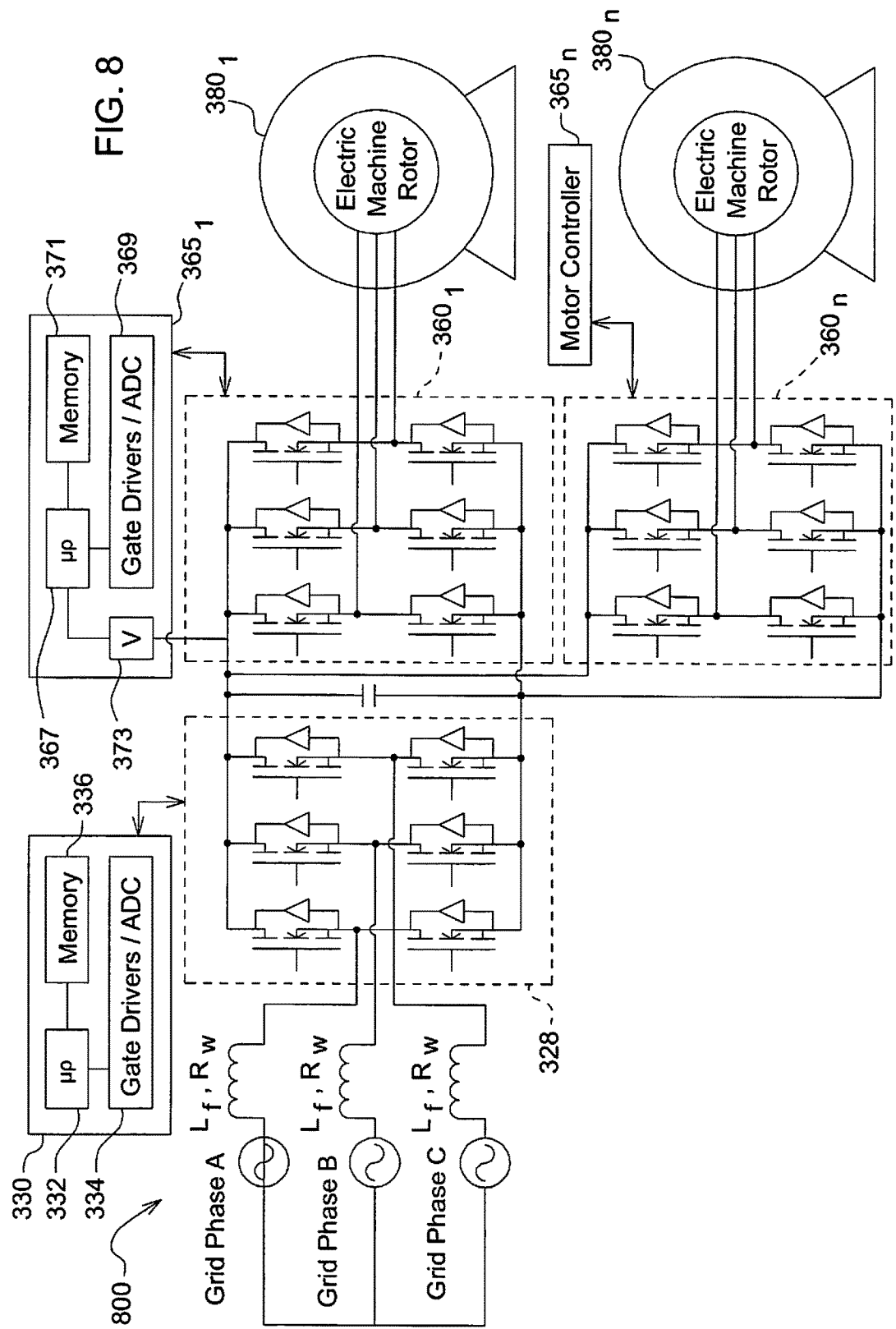

Example embodiments also be applied to active front end related systems such as shown in FIG. 8. The system of FIG. 8 is the same as the system in FIG. 3 except an active front end (e.g., a grid) 800 is connected with utility grid through line/filter inductors instead of a generator being present.

In one or more example embodiments, lab characterization of current regulator bandwidths for each traction device and generator is as follows:

1. Give the step command to $i_q$. Keep $i_d$ zero.
2. Determine a time constant $\tau$ from the plot. This is the time for the value of $i_q$ to increase from 0% to 63% of the final value.
3. Determine $\omega_{bw}$ from $\tau$. $\omega_{bw}=1/\tau$ (rad/s)
4. Determine $f_{BW}=\omega_{bw}/2\pi$ (Hz)
5. Compare $f_{BW}$ with the set current regulator bandwidth in the controller of the applicable traction device or generator. If the experimentally calculated current regulator bandwidth is not equal to the set current regulator bandwidth in the controller, the gains $K_p^d$, $K_p^q$, $K_i^d$ and $K_i^q$ are adjusted to get the desired current regulator bandwidth through experimental verification.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A controller comprising:
a memory having computer-readable instructions stored therein; and
at least one, processor configured to execute the computer-readable instructions to,
determine a first set of inductance values for at least one load machine and a second set of inductance values for a generator machine,
determine a first set of gains for the at least one load machine based on the first set of inductance values and a first regulator bandwidth,
determine a second set of gains for the generator machine based on the second set of inductance values and the first regulator bandwidth, and
generate voltage commands for driving the at least one load machine and the generator machine based on at least the first and second sets of gains.

2. The controller of claim 1, wherein the at least one processor is configured to execute the computer-readable instructions to,
determine a first set of voltage and current values for the at least one load machine and a second set of voltage and current values for the generator machine,
determine the first set of inductance values based on the first set of voltage and current values, and
determine the second set of inductance values based on the second set of voltage and current values.

3. The controller of claim 2, wherein the at least one processor is configured to execute the computer-readable instructions to, receive a torque command for the at least one load machine, and determine current values of the first set of voltage and current values, and current values of voltage and current values for supplying the received torque command.

4. The controller of claim 3, wherein the at least one processor is configured to execute the computer-readable instructions to determine the current values of the first set of voltage and current values, and the current values of the second set voltage and current values prior to generating any of the voltage commands for the at least one load machine and the generator machine.

5. The controller of claim 3, wherein the at least one processor is configured to execute the computer-readable instructions to determine the current values for the generator machine by, determining a generator torque command, and determining the current values of the second set of voltage and current values based on the determined generator torque command.

6. The controller of claim 5, wherein the at least one processor is configured to execute the computer-readable instructions to determine the generator torque command based on the received torque command and an initial generator torque command obtained based on a direct current (DC) voltage output of a proportional-integral controller.

7. The controller of claim 5, wherein the at least one processor is configured to execute the computer-readable instructions to, generate a feedforward torque command based on the received torque command, a ratio of a speed of a rotor shaft of the at least one load machine to a speed of a rotor shaft of the generator machine and an efficiency factor, and determine the generator torque command based on the feedforward torque command and an initial generator torque command.

8. The controller of claim 7, wherein upon having two or more load machines, the at least one processor is configured to execute the computer-readable instructions to, generate the feedforward torque command for each of the two or more load machines, and determine the generator torque command based on a sum of the generated feedforward torque commands, the generator torque command being generated simultaneously with a receipt of a corresponding torque command at each of the two or more load machines.

9. The controller of claim 1, wherein the first set of inductance values are d-axis and q-axis inductances of the at least one load machine, the second set of inductance values are d-axis and q-axis inductances of the generator machine, the first set of gains are d-axis and q-axis P-I gains of a proportional integral controller of the at least one load machine, the second set of gains are d-axis and q-axis P-I gains of a proportional integral controller of the generator machine, the voltage commands of the at least one load machine are d-axis and q-axis voltage commands of the at least one load machine, and the voltage commands of the generator machine are d-axis and q-axis voltage commands of the generator machine.

10. The controller of claim 1, wherein the first regulator bandwidth is a regulator bandwidth of the at least one load machine and the generator machine has a second regulator bandwidth, the first regulator bandwidth and the second regulator bandwidth being the same.

11. A system comprising:

at least one load machine coupled to a first inverter;

a generator machine coupled to a second inverter; and a controller configured to synchronize a generation of voltage commands for driving the at least one load machine and the generator machine to meet a torque command, wherein the controller is configured to synchronize the generation of voltage commands for driving the at least one load machine and the generator machine by, obtaining a first set of inductance values for at least one load machine and a second set of inductance values for a generator machine, determining a first set of gains for the at least one load machine based on the first set of inductance values and a regulator bandwidth, determining a second set of gains for the generator machine based on the second set of inductance values and the regulator bandwidth, and synchronizing the generation of the voltage commands for driving the at least one load machine and the generator machine based on at least the first and second sets of gains.

12. The system of claim 11, further comprising:

an inverter circuit including the first inverter, the second inverter and a capacitor.

13. The system of claim 11, further comprising:

at least two or more load machines, each of the at least two or more load machines has a corresponding first inverter, wherein the controller is configured to synchronize the generation of the voltage commands for driving the at least two or more load machines and the generator machine.

14. The system of claim 11, wherein the controller is configured to, determine a first set of voltage and current values for the at least one load machine and a second set of voltage and current values the generator machine, determine the first set of inductance values for the at least one load machine based on the first set of voltage and current values, and determine the second set of inductance values based on the second set of voltage and current values.

15. The system of claim 11, wherein the controller is configured to synchronize the generation of the voltage commands by, receiving a torque command for the at least one load machine, and simultaneously utilizing the torque command to determine the current values of the first set of voltage and current values, and the current values of the second set of voltage and current values based on the torque command.

16. The system of claim 11, further comprising:

a diesel engine configured to operate at a near fixed speed, the diesel engine being coupled to the generator machine.

17. The system of claim 11, wherein the first inverter and the second inverter are connected to a same direction current (DC) bus, and the second inverter is configured to operate voltage control mode.

18. The system of claim 17, wherein the second inverter is configured to regulate a voltage of the DC bus.

\* \* \* \* \*

UNITED STATES PATENT AND TRADEMARK OFFICE
CERTIFICATE OF CORRECTION

| | | |
|---|---|---|
| PATENT NO. | : 10,348,222 B2 | Page 1 of 1 |
| APPLICATION NO. | : 15/635376 | |
| DATED | : July 9, 2019 | |
| INVENTOR(S) | : Dutta et al. | |

It is certified that error appears in the above-identified patent and that said Letters Patent is hereby corrected as shown below:

In the Specification

At Column 1 after Line 10, insert the following:
--GOVERNMENT LICENSE RIGHTS
This invention was made with U.S. government support under contract or award No. DE-EE0006521 awarded by the Department of Energy. The Government has certain rights in the invention.--

Signed and Sealed this
Fifth Day of November, 2019

Andrei Iancu
*Director of the United States Patent and Trademark Office*